United States Patent
Asfoor et al.

(10) Patent No.: US 11,807,407 B2
(45) Date of Patent: Nov. 7, 2023

(54) SYSTEM, APPARATUS, AND METHOD FOR INSPECTING INDUSTRIAL STRUCTURES USING A UAV

(71) Applicant: Saudi Arabian Oil Company, Dhahran (SA)

(72) Inventors: Fadhel Asfoor, Qatif (SA); Aziz Rehman, Dhahran (SA); Fadi Abdellatif, Thuwal (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 43 days.

(21) Appl. No.: 17/655,128

(22) Filed: Mar. 16, 2022

(65) Prior Publication Data

US 2023/0294851 A1    Sep. 21, 2023

(51) Int. Cl.
| | | |
|---|---|---|
| *B64U 60/20* | (2023.01) | |
| *B64C 39/02* | (2023.01) | |
| *B64U 101/30* | (2023.01) | |
| *B64U 101/60* | (2023.01) | |
| *B64U 101/26* | (2023.01) | |

(52) U.S. Cl.
CPC .............. *B64U 60/20* (2023.01); *B64C 39/024* (2013.01); *B64U 2101/26* (2023.01); *B64U 2101/30* (2023.01); *B64U 2101/60* (2023.01)

(58) Field of Classification Search
CPC ............................ B64U 60/20; B64U 2101/26
See application file for complete search history.

(56) References Cited

U.S. PATENT DOCUMENTS

| | | | |
|---|---|---|---|
| 11,097,796 B2 | 8/2021 | Abdellatif et al. | |
| 11,235,823 B2 | 2/2022 | Abdelkader et al. | |
| 11,584,516 B2 * | 2/2023 | Abdellatif | .............. B64C 25/32 |
| 2019/0348862 A1 * | 11/2019 | Obayashi | ............... B64U 50/19 |
| 2020/0011995 A1 * | 1/2020 | Send | ....................... G01S 17/42 |
| 2020/0172184 A1 | 6/2020 | Abdellatif et al. | |
| 2020/0172231 A1 * | 6/2020 | Abdellatif | ........... G08G 5/0069 |
| 2020/0172232 A1 | 6/2020 | Abdellatif et al. | |
| 2020/0174478 A1 | 6/2020 | Abdellatif et al. | |
| 2021/0356255 A1 * | 11/2021 | Sweers | ............... G01B 11/303 |

(Continued)

OTHER PUBLICATIONS

Inductosense Ltd.; TMS Sensor; Techincal Datasheets; https://www.inductosense.com/literature/#WANDDatasheets; 2 pages.

(Continued)

*Primary Examiner* — Jessica B Wong
(74) *Attorney, Agent, or Firm* — Leason Ellis LLP

(57) ABSTRACT

A method of inspecting a curved surface using an unmanned aerial vehicle (UAV) by activating a plurality of sensors having at least respective portions disposed on the curved surface, the method including flying the UAV to a proximity of a first of the plurality of sensors; activating the first sensor by an activation device coupled to the UAV; attaching at least one magnetic leg of the UAV to a ferromagnetic surface proximate the first sensor, the at least one magnetic leg having a magnet, moving the activation device coupled to the UAV towards the first sensor while the at least one magnetic leg is attached to the ferromagnetic surface; and, when the activation device is positioned in proximity of the first sensor, receiving first sensor data from the activated first sensor via the activation device.

17 Claims, 14 Drawing Sheets

(56) References Cited

U.S. PATENT DOCUMENTS

2022/0169368 A1* 6/2022 Abdellatif .............. B64C 25/32
2022/0212214 A1* 7/2022 Kominami ........... B05B 13/005

OTHER PUBLICATIONS

Inductosense Ltd.; Wand; Techincal Datasheets; https://www.inductosense.com/literature/#WANDDatasheets; 2 pages.
Inductosense Ltd.; IDM Software; Techincal Datasheets; https://www.inductosense.eom/literature/#WANDDatasheets; 2 pages.
Inductosense Ltd.; Accessories; Techincal Datasheets; https://www.inductosense.eom/literature/#WANDDatasheets; 2 pages.
Inductosense Ltd.; Wand-RDC; Techincal Datasheets; https://www inductosense.eom/literature/#WANDDatasheets; 2 pages.
Swarm; Real-time corrosion and erosion monitoring system; Cosasco Sensorlink (2018); https://web.intrial.com.pe/2020/04/222627_SWARM_Wall_Thickness_Monitor_Data_Sheet.pdf; 9 pages.
Baker Hughes a GE company; Predictive Corrosion Management (2017); 8 pages.
Emerson; Corrosion and Erosion Monitoring Systems for Enhanced Profitability (2019); https://www.emerson.com/en-us/catalog/rosemount-sku-permasense-et310-corrosion-erosion-monitoring-system?cm_cr=No+Campaign-_-Web+Activity-_-ProductRecommendations+Activity-_-ProductRecommendations-_-Rosemount%26%238482%3B+Wireless+Permasense+ET310+Corrosion+and+Erosion+Monitoring+System-productImageLink; 4 pages.

\* cited by examiner

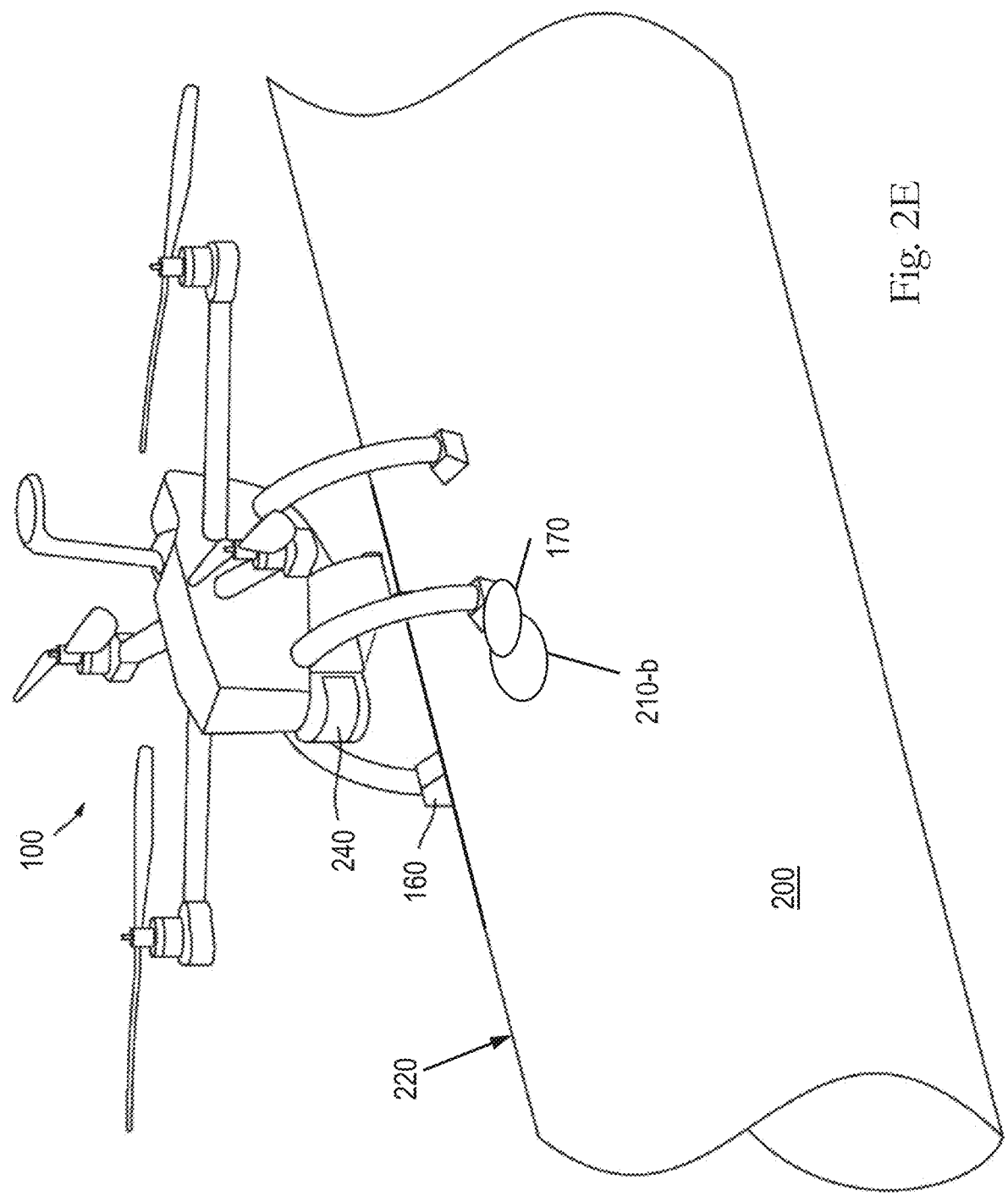

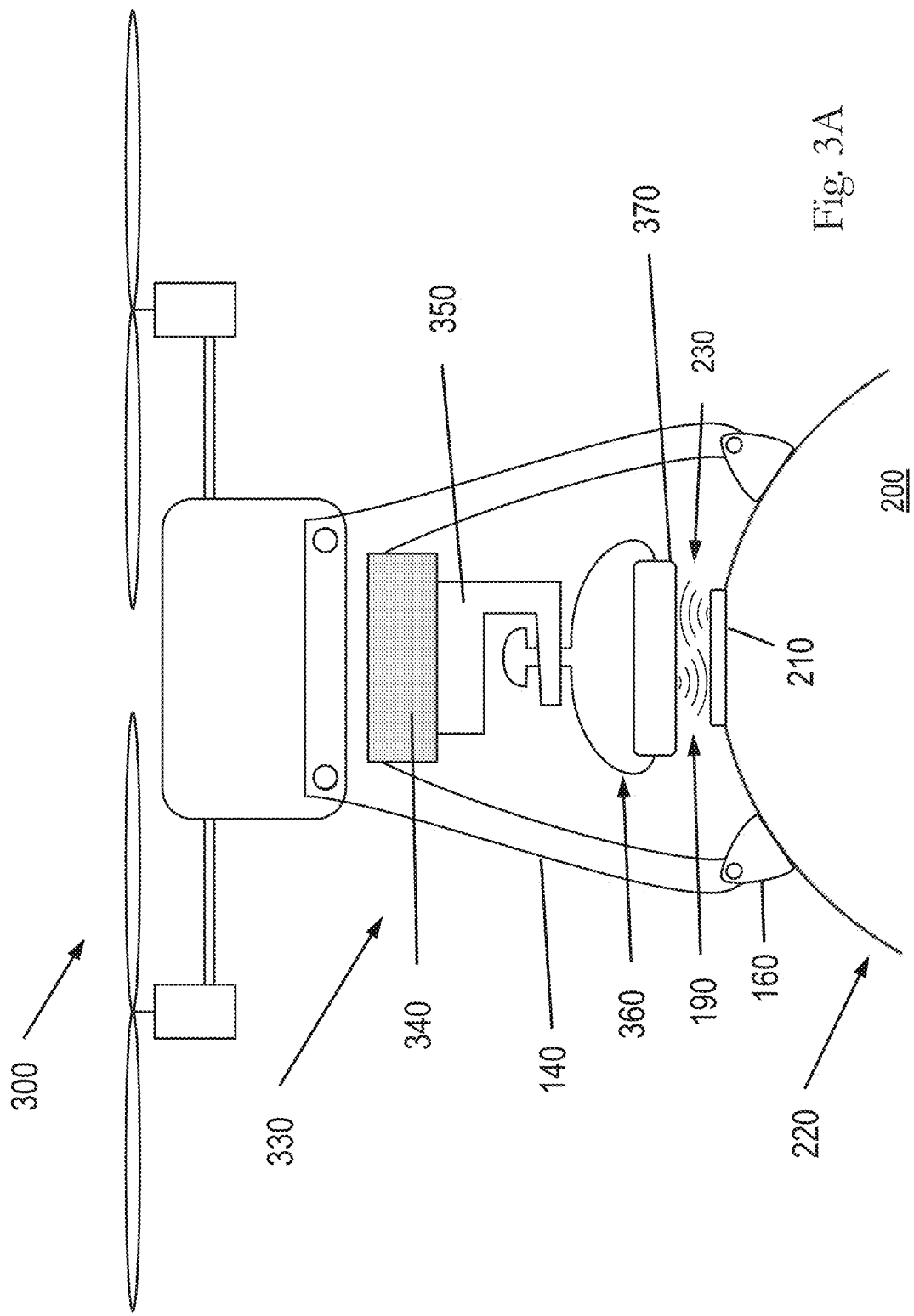

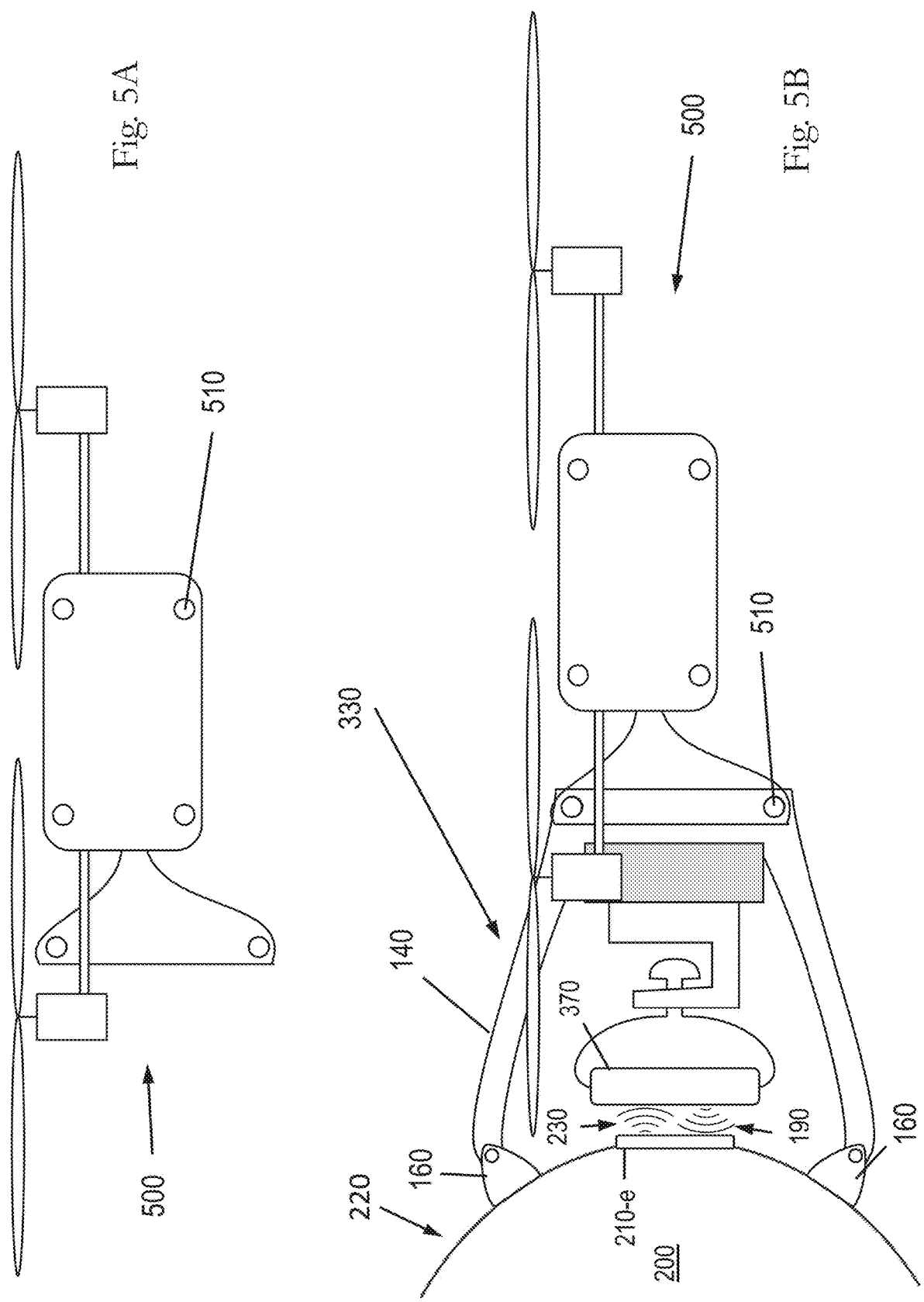

SYSTEM, APPARATUS, AND METHOD FOR INSPECTING INDUSTRIAL STRUCTURES USING A UAV

FIELD OF THE DISCLOSURE

The present disclosure generally relates to the inspection and maintenance of a structure, and specifically to using an unmanned aerial vehicle (UAV) configured to support an activation device which is utilized to activate a non-destructive testing patch associated with the structure which is then used for autonomous inspection and maintenance missions.

BACKGROUND OF THE DISCLOSURE

Industrial structures require periodic inspection and maintenance, especially those that involve corrosive and/or hazardous materials at high volumes. Such industrial structures can include metallic assets—for example, pipes, vessels, storage tanks, and the like—for which periodic inspections are extremely important to check their integrity and ensure proactive measures are taken before a failure happens.

The inspections can be difficult or impractical to perform by humans in some environments. As an example, a common inspection that needs to be perform periodically is a measurement of a pipe's wall thickness to detect internal corrosion. Typically, an inspector manually operates a handheld NDT (nondestructive testing) probe, such as ultrasound testing (UT) sensors, and moves it around across a certain area of a pipe to find the spot of least thickness, which would be marked for periodic inspection.

This process is laborious and requires significant manpower, including the need to erect structures such as scaffolding to access inspection areas when the asset that needs to be inspected is elevated. This translates to significant costs.

As an alternative or supplement to manual inspections, permanent NDT sensors, such as UT probes, have been installed at certain areas in the assets that are expected to suffer from the most corrosion, such as pipe elbows. These sensors, if powered, continuously measure the thicknesses at the installed locations and send the measurements remotely to a control apparatus or database—e.g., a computing apparatus in a control room—for viewing and/or analysis. While the permanent NDT sensors might replace manual inspections especially for hard to access locations, they are significantly more costly than handheld probes and are limited to each taking measurements at one location.

SUMMARY OF THE DISCLOSURE

In view of these issues, there has been a long felt need for a low cost and flexible process of regularly inspecting industrial assets.

The present disclosure provides an automated UAV (or drone) that is adapted to follow one or more paths in successively inspecting each of a plurality of inspection locations at industrial assets, such as pipes and the like, by positioning activators using a crawler or an arm in order to activate one or more passive sensors installed at the respective plurality of inspection locations and collect measurement data therefrom.

According to an example implementation consistent with the present disclosure, an unmanned aerial vehicle (UAV) comprises: a body constructed to enable the UAV to fly; a first leg connected to the body and configured to releasably attach the flying UAV to a ferromagnetic surface, the first leg comprising a magnet adapted to magnetically attach the first leg to the ferromagnetic surface; and a second leg connected to the body and configured to place an activation device proximate a sensor disposed at least partially on a curved surface in a vicinity of the ferromagnetic surface, the second leg being connected to the body on one end and comprising the activation device disposed on another end opposite the one end, wherein the second leg is movable in relation to the body for moving the activation device towards the sensor while the first leg is magnetically attached to the ferromagnetic surface.

In accordance with another example implementation consistent with the disclosure, a method of inspecting a curved surface using an unmanned aerial vehicle (UAV) having a releasable crawler by activating a plurality of sensors having at least respective portions disposed on the curved surface, the method comprises: flying the UAV to a proximity of a first of the plurality of sensors; attaching at least one magnetic leg of the UAV to a ferromagnetic surface proximate the first sensor, the at least one magnetic leg having a magnet, comprising: passively articulating the at least one magnetic leg of the UAV toward the ferromagnetic surface; magnetically attaching the articulated at least one magnetic leg of the UAV to the ferromagnetic surface using the magnet; and maintaining the magnetic attachment of at least one magnetic leg to the ferromagnetic surface; moving a sensor leg of the UAV having a first activation device disposed thereon towards the first sensor while the at least one magnetic leg is attached to the ferromagnetic surface, wherein the first activation device activates the first sensor when placed in proximity of the first sensor; detaching the releasable crawler onto the ferromagnetic surface from the attached UAV; maneuvering the detached crawler on the ferromagnetic surface toward a second sensor while magnetically attaching the crawler to the ferromagnetic surface using magnetic wheels of the crawler; and activating the second sensor by placing a second activation device disposed on the releasable crawler proximate the second sensor.

In accordance with an example implementation consistent with the disclosure, an unmanned aerial vehicle (UAV) comprises: a body constructed to enable the UAV to fly; a first leg connected to the body and configured to releasably attach the flying UAV to a ferromagnetic surface, the first leg comprising a magnet adapted to magnetically attach the first leg to the ferromagnetic surface; and a second leg connected to the body and configured to place an activation device proximate a sensor disposed at least partially on a curved surface in a vicinity of the ferromagnetic surface, the second leg being connected to the body at one end and comprising the activation device disposed at another end opposite the one end, wherein the second leg is movable in relation to the body to position the activation device towards the sensor while the first leg is magnetically attached to the ferromagnetic surface.

According to one example implementation, one or more of the first leg and the second leg are coupled to respective mounting points on a rotating rail, the respective mounting points being adapted to rotate the one or more of the first leg and the second leg in relation to the body.

According to one example implementation, the respective mounting points are motorized for rotating the one or more of the first leg and the second leg during flight of the UAV.

According to one example implementation, the respective mounting points are adapted to rotate the second leg to orient the activation device according to a placement of the sensor on the curved surface.

According to one example implementation, the activation device is oriented according to the placement of the sensor on a bottom portion of the curved surface.

According to one example implementation, the activation device is oriented according to the placement of the sensor on a side portion of the curved surface.

In accordance with an example implementation consistent with the disclosure, a method of inspecting a curved surface using an unmanned aerial vehicle (UAV) by activating a plurality of sensors having at least respective portions disposed on the curved surface, comprises: flying the UAV to a proximity of a first of the plurality of sensors; activating the first sensor by an activation device coupled to the UAV; attaching at least one magnetic leg of the UAV to a ferromagnetic surface proximate the first sensor, the at least one magnetic leg having a magnet, comprising: passively articulating the at least one magnetic leg of the UAV toward the ferromagnetic surface; magnetically attaching the articulated at least one magnetic leg of the UAV to the ferromagnetic surface using the magnet; and maintaining the magnetic attachment of the at least one magnetic leg to the ferromagnetic surface; moving the activation device coupled to the UAV towards the first sensor while the at least one magnetic leg is attached to the ferromagnetic surface; and when the activation device is positioned in proximity of the first sensor, receiving first sensor data from the activated first sensor via the activation device.

According to one example implementation, the method further comprises: detaching the at least one magnetic leg of the UAV from the ferromagnetic surface; navigating the UAV to a proximity of a second of the plurality of sensors; activating the second sensor by the activation device coupled to the UAV; moving the activation device towards the second sensor; and when the activation device is positioned in proximity of the second sensor, receiving second sensor data from the activated second sensor via the activation device.

According to one example implementation, when the receiving of the second sensor data is completed, the UAV navigates to a home base or a proximity of a next sensor.

According to one example implementation, the proximity of the activation device to the first sensor is determined based at least in part on a signal strength detected by the activation device from the first sensor.

According to one example implementation, the method further comprises, prior to the activating, orienting the at least one magnetic leg and the activation device according to a placement of the first sensor on the curved surface.

According to one example implementation, the at least one magnetic leg and the activation device are oriented according to the placement of the first sensor on a bottom portion of the curved surface.

According to one example implementation, the at least one magnetic leg and the activation device are oriented according to the placement of the first sensor on a side portion of the curved surface.

In accordance with an example implementation consistent with the disclosure, an unmanned aerial vehicle (UAV) comprises: a body constructed to enable the UAV to fly; one or more legs connected to the body and configured to releasably attach the flying UAV to a ferromagnetic surface, each of the one or more legs comprising a magnet adapted to magnetically attach to the ferromagnetic surface; and an activation device coupled to the body and adapted to be placed proximate a sensor disposed at least partially on a curved surface in a vicinity of the ferromagnetic surface, wherein the activation device is movable in relation to the body towards the sensor while the one or more legs are magnetically attached to the ferromagnetic surface.

According to one example implementation, the one or more legs and the activation device are coupled to respective mounting points that are oriented to a side or a top in relation to the body.

According to one example implementation, the one or more legs and the activation device are oriented according to a placement of the sensor on a bottom portion of the curved surface.

According to one example implementation, the one or more legs and the activation device are oriented according to a placement of the sensor on a side portion of the curved surface.

BRIEF DESCRIPTION OF THE DRAWING FIGURES

Various example implementations of this disclosure will be described in detail, with reference to the following figures, wherein:

FIG. 1 is an exploded profile illustration of a UAV with a detachable undercarriage according to an example implementation of the present disclosure.

FIGS. 2A, 2B, 2C, and 2D are profile view illustrations of the UAV being coupled to undercarriage of FIG. 1 for reading passive sensors that are disposed at different positions on a ferromagnetic surface while the UAV is in different orientations according to example implementations of the present disclosure.

FIG. 3A is a profile view illustration of a UAV that incorporates an alternative undercarriage for accommodating a sensor scanning device according to an example implementation of the present disclosure.

FIG. 5A is a profile view of an example UAV having modular mounting points for attaching the undercarriage of FIGS. 3A and 3B.

FIGS. 5B and 5C are profile views of the UAV of FIG. 5A with the attached undercarriage at side and top orientations, respectively, with respect to the UAV according to an example implementation of the present disclosure.

DETAILED DESCRIPTION OF CERTAIN EMBODIMENTS OF THE DISCLOSURE

Figure 1:
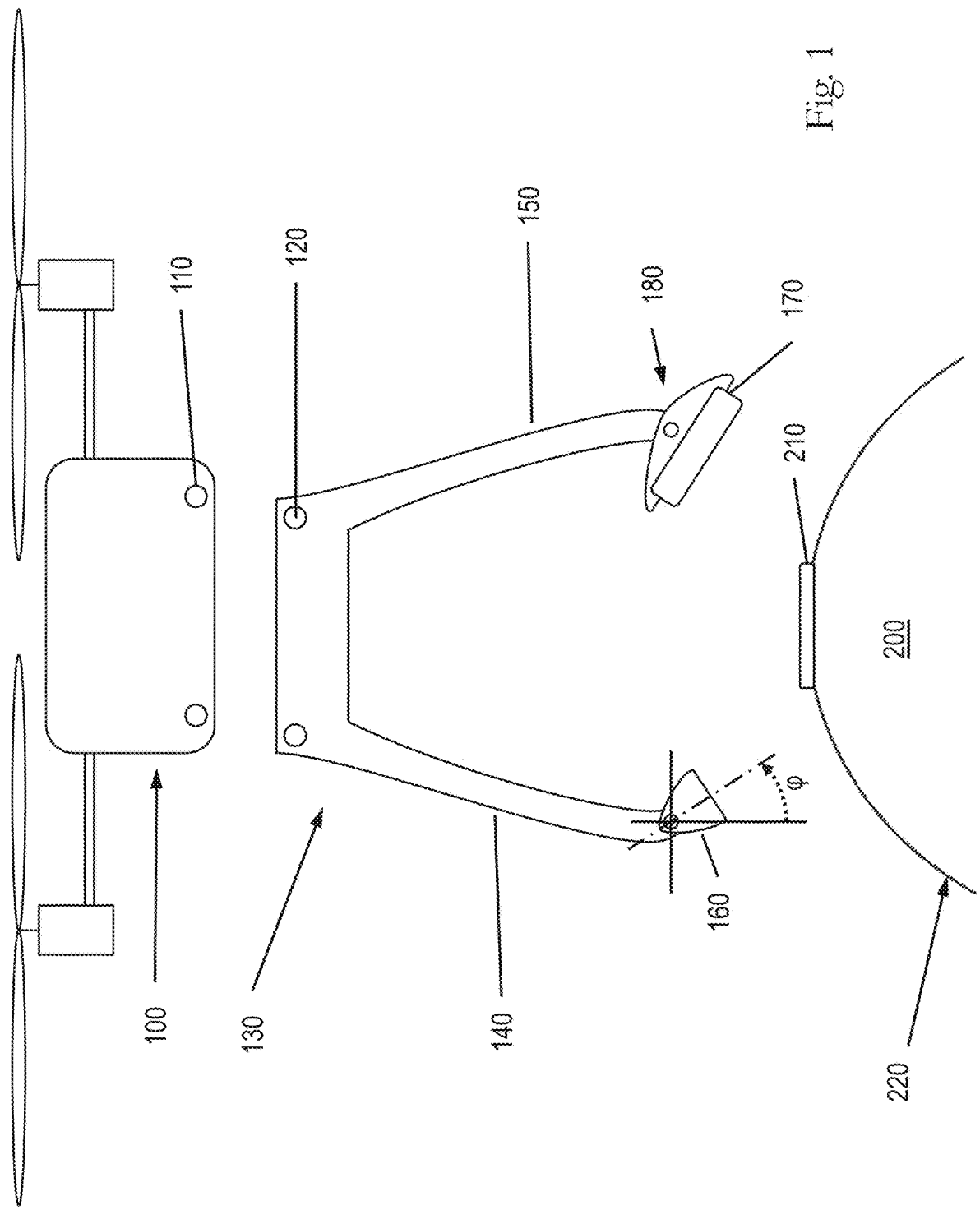

By way of overview and introduction, in the oil and gas industry, all assets, such as pipes, are divided into various inspection points that need to be inspected regularly. These points can be classified into various risk classes depending on the severity of their corrosion condition and calculated remaining life. A high risk class can be designated to inspection points that are exposed to high levels of corrosion and/or that are associated with assets nearing the ends of their service lives. Conversely, a low risk class can be designated to inspection points that are exposed to relatively lower levels of corrosion and/or that are associated with assets having substantial remaining service lives.

Inspection points with a high-risk corrosion class require more frequent inspections compare to other classes especially if they are located in a critical asset. In order to make their inspection easier, and less expensive, and monitoring more frequent, Permanent UT Sensors with Wireless Capability are installed to provide real time thickness measurements. Examples of permanent UT sensors include those marketed by Emerson, BHGE, and Cosasco.

However, as described above, permanent sensors are costly (~$2K per sensor) and can, therefore, be impractical when a site requires large numbers of inspection points. Additionally, sophisticated networking equipment is needed to gather data from the plethora of sensors (~$7K) as well as monitoring and storage software (~$20K). Such high costs might be justifiable for high-risk inspection points. However, the high cost and connectivity complexity makes the installation of permanent NDT sensors (such as UT) impractical for inspection points in low-risk corrosion classes, which can tend to be large in number in a typical facility (e.g., hundreds of thousands, or even millions, of inspection points with low criticality). Correspondingly, a permanent sensor system that is narrowly tailored for high-risk inspection points fails to address large numbers of inspection points of other classifications.

As an alternative to these high-cost network-connected permanent NDT sensors, low-cost standalone NDT passive sensors (such as UT) have recently been used. These sensors are housed in adhesive patches, which are also permanently installed at respective inspection points. The sensors are passive devices and, therefore, require an activation device to remotely power and activate them. An example of these sensor patches being used is the WAND™ system marketed by Inductosense Ltd. In the WAND™ system, a handheld data collection device is placed in close proximity to each patch by an operator. The device powers the sensor housed in the patch, which in turn performs a one-time thickness measurement. The measurement data is transmitted from the sensor in the patch to the handheld device.

The passive sensor patches remove the need to perform laborious surface cleaning and preparations that are required for a manual inspection measurement. They also reduce the time needed by an operator manually operating a probe to take measurements at prescribed inspection locations. The passive sensor patches provide immediate measurement readings at their respective preset inspection points and, therefore, drastically reduce the time needed to perform thickness measurements by an operator when compared to manual inspections. Thus, the time and labor saved over each inspection round of tens/hundreds of inspection points in a facility can be substantial. Additionally, when compared to permanent active UT sensors, the passive sensor patches are significantly less costly and they do not require any connectivity or power.

However, while they reduce the time needed for an operator to collect measurement data, the numerous inspection points in any given facility still require significant time and labor to conduct periodic inspections. Furthermore, hard to access inspection locations still require access preparations—such as erecting scaffoldings and the like—for an operator of the handheld data collection device to reach the sensor patches at these locations.

The present disclosure concerns a UAV having a sensor scanning device for inspecting or maintaining a structure by activating and reading passive sensors that are disposed on the surface of the structure. These passive sensors can be adhered to the surface of the structure at locations that are especially susceptible to corrosion and that require periodic inspection. Advantageously, the UAV of the present disclosure is configured to more readily activate and read such passive sensors that are disposed at elevated or otherwise difficult-to-access locations on a structure (e.g., pipe or storage tank). The UAV is a hybrid UAV that has advanced capabilities to perform contact inspection jobs on curved ferromagnetic surfaces such as carbon steel pipes, storage tanks, and other structures. In use, the UAV files toward a structure to be inspected, at least partially attaches to or lands on it autonomously (commonly referred to as perching), to perform inspection jobs utilizing passive sensors that are disposed at any angle of orientation on the structure.

As noted, the inspection and maintenance of exposed metallic assets, such as pipes, storage tanks, and the like, can sometimes be difficult or impractical to perform by people. For instance, one of the top challenges in the oil and gas industry is the periodic inspection of elevated assets found in refineries, gas plants, offshore platforms, and other plants and facilities. These assets include high elevation pipes and structures that are difficult to access during inspection or maintenance jobs. Even with the use of passive sensor patches, the only way for people to inspect or maintain them is to erect scaffolding in order for the inspector or engineer to access the asset and to activate and read the passive sensor patches at these difficult to access locations. Such scaffolding is not only expensive and introduces a significant cost barrier for frequent inspection, but also poses safety concerns mainly in the form of falling and tripping hazards.

Accordingly, in example implementations, a UAV according to this disclosure has a sensor scanning device which provides a solution to the aforementioned technical problems with respect to efficiently inspecting large numbers of passive sensors that are disposed throughout a structure and/or facility, with the sensor scanning device being positionable to activate passive sensors.

The combined use of a UAV and passive sensors further provides for a more efficient approach than having the UAV conduct direct inspections using an onboard UT sensor or a UAV having a mobile crawler that is deployed on a structure for conducting the inspections using an onboard UT sensor. Among other advantages, the placement of the passive sensors ensures accurate and consistent inspections by a UAV that scans and reads the passive sensors. Additionally, the passive sensors can serve as navigation checkpoints that potentially streamline the autonomous navigation of a UAV.

FIG. 1 is an exploded profile illustration of a UAV 100 with a detachable undercarriage 130 according to an example implementation of the present disclosure. As illustrated in FIG. 1, UAV 100 includes a set of mounting points 110 for mating with a corresponding set of mounting points 120 on an undercarriage 130. In this fashion, any compatible UAV/undercarriage combination (e.g., compatible mounting points and payload capacities/weights) can be assembled for a desired purpose. In accordance with the example implementation illustrated in FIG. 1, undercarriage 130 incorporates at least one pair of legs 140 and 150 that are respectively adapted to attach to structure 200 and to activate passive sensor 210 for inspecting the interior of structure 200. To this end, one leg 140 of undercarriage 130 incorporates an articulated magnet 160 and another leg 150 incorporates a sensor scanning device 170 via a rotatable coupling 180. Articulated magnet 160 is mounted to leg 140 to allow for orienting towards and adhering to a curved ferromagnetic surface 220 on structure 200 when the UAV 100 approaches sensor 210, as illustrated in FIG. 1. In an example implementation, articulated magnet 160 operates according to the disclosure in U.S. Pat. No. 11,097,796, entitled "Articulated Magnet-Bearing Legs for UAV Landing on Curved Surfaces," which is hereby incorporated by reference. Once magnet 160 is adhered to surface 220, UAV 100 is stabilized to structure 200 and sensor scanning device 170 then can be maintained proximate a passive sensor 210, as shown in FIG. 1. For ease of description, it is assumed throughout that structure 200 is larger (such as significantly larger) than UAV 100. In other words, the figures are not to scale and are for illustrative purposes only. According to the present disclosure structure 200 is larger in every dimension than UAV 100 so that UAV 100 can readily attach to the surface 220.

The articulation joint of magnet 160 on leg 140 enables pivoting of the magnet 160 in its housing relative to the surface 220 to which the leg 140 is about to attach. Such pivoting can be along multiple axes such as when the joint comprises a universal joint. The pivoting can be around an axis of the leg 140 or joint, as shown, to assume an angle φ relative to the axis, and optionally relative to additional angles θ (not shown), etc. Correspondingly, rotatable coupling 180 of sensor scanning device 170 also enables pivoting of the sensor scanning device 170 in its housing relative to the surface 220 to be adjustable to a surface angle of sensor 210 relative to surface 220. Same as above, this pivoting can be along multiple axes such as when the joint comprises a universal joint. The pivoting can be around an axis of the leg 150 or joint, to also assume an angle (not shown) relative to the axis, and optionally relative to additional angles (not shown), etc.

The UAV 100 and undercarriage 130 are configured primarily to read passive sensors 210 that are installed on the top half of a structure 200 (e.g., to keep the rotors of the UAV 100 reasonably level and away from structure 200 before, during, and after reading sensor 210).

According to an example implementation, UAV 100 can be flown to a proximity of sensor 210, where sensor scanning device 170 is positioned so as to activate the power sensor 210 and to read measurement data therefrom without attaching magnet 160 to surface 220. Additionally, UAV 100 can attach magnet 160 to surface 220 for stability in reading sensor 210. In some implementations, UAV 100 can be attached to surface 220 via magnet 160 for pivoted movement and alignment among multiple sensors 210 that generally are arranged in close proximity with one another on or along surface 220.

FIGS. 2A, 2B, 2C, and 2D are profile view illustrations of UAV 100 being coupled to undercarriage 130 of FIG. 1 and reading passive sensors 210 and 210-b that are disposed at different positions on surface 220 in different orientations according to example implementations of the present disclosure.

Figure 2A:
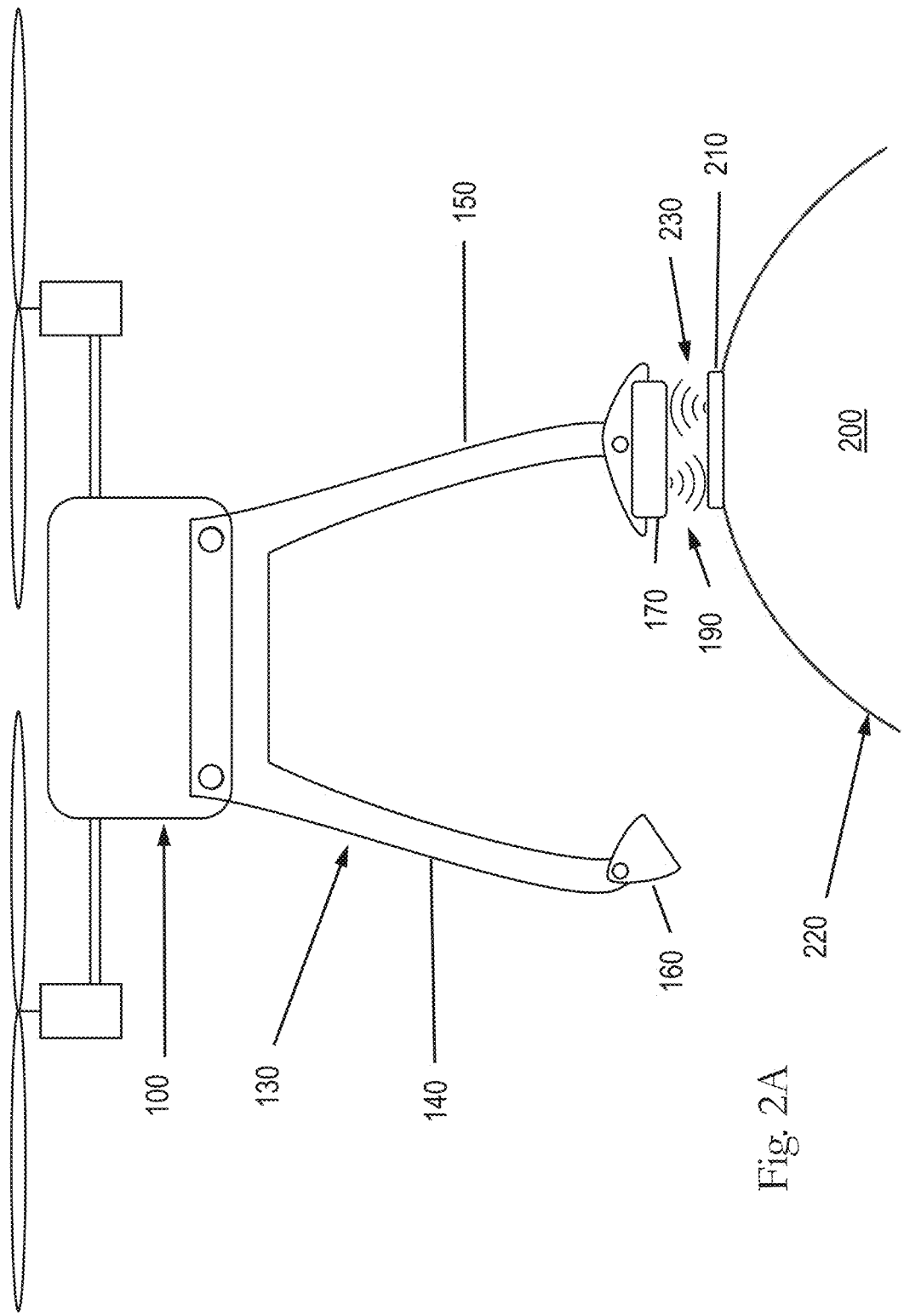
FIG. 2E is an illustration of an example UAV at least partially attached to a structure (for example, a pipe), with the UAV having a sensor scanning device on one leg for activating and reading a passive sensor disposed on the surface of the structure for inspecting or maintaining the structure, according to an example implementation of the present disclosure.

As shown in FIG. 2A, UAV 100 is flown to a proximity of sensor 210 that is disposed at least partially at a top portion of an outer surface 220 of structure 200. According to an example implementation, structure 200 is an industrial pipe and at least a portion of outer surface 220 is a ferromagnetic surface—for example, steel and the like. As illustrated in FIG. 2A, outer surface 220 is a curved surface in correspondence with an outer shape of a pipe and sensor 210 is disposed near a 12 o'clock position at a top portion of surface 220. Accordingly, UAV 100 is controlled to hover over structure 200 so that sensor scanning device 170 is aligned with sensor 210. As illustrated in FIG. 2A, sensor scanning device 170 transmits an electromagnetic (EM) signal 190 (or sensor activation signal 190), which provides electrical power to sensor 210 to thereby activate it for reading a thickness (e.g., a wall thickness) of structure 200. Once activated, sensor 210 determines an internal thickness of structure 200 at the location of sensor 210. As an example, sensor 210 incorporates a UT sensor that is powered by EM signal 190 via a transducer (not shown). Thus, sensor 210 determines an interior thickness of structure 200 by processing the returned signals from the UT sensor and transmits data associated with the thickness reading via a response EM signal 230 to sensor scanning device 170. Accordingly, the data received by sensor scanning device 170 is stored in a memory device (not shown) carried by UAV 100 and/or transmitted to another device, such as a user remote control device. In an example implementation, a control apparatus (not shown) in communication with UAV 100 collects the measurement data for inspection and maintenance management. Once a valid reading from sensor 210 is received and confirmed via sensor scanning device 170, UAV 100 is controlled to navigate to a next sensor, or to end an inspection when sensor 210 is a final sensor. In some implementations, UAV 100 stores all readings from sensors (210) in an onboard memory device (not shown) and uploads the stored readings after completing an inspection run and docking at a control station (not shown). In some example implementations, sensor 210 can incorporate alternative sensor types, such as electromagnetic acoustic transducers (EMAT), eddy current sensors, magnetic flux leakage (MFL) sensors, etc. Thus, the present disclosure provides for checking not just the thickness but also surface cracks, corrosion under insulations, and the like, of structure 200.

According to an example implementation, sensor scanning device 170 transmits signal 190 towards sensor 210 based on a proximity and/or an alignment determination by a preprogrammed algorithm or based on a toggle signal from an operator via a remote control apparatus (not shown)— e.g., when it is determined that sensor scanning device 170 is within a predetermined distance from sensor 210. In some implementations, sensor 210 can be activated and operated by sensor scanning device 170 from a distance of up to 100 mm (millimeter) and can determine thicknesses of ~1 mm to ~200 mm for structure 200. In an example implementation, the operating frequency of sensor 210 is between ~1 MHz (megahertz) and ~10 MHz, or ~5 MHz. Accordingly, the resolution of the thickness reading by sensor 210 is less than ~0.05 mm. In one example implementation, sensor 210 incorporates an adhesive for convenient installation on surface 220 and is operable to read structures (200) with diameters of at least ~40 mm.

Figure 2B:
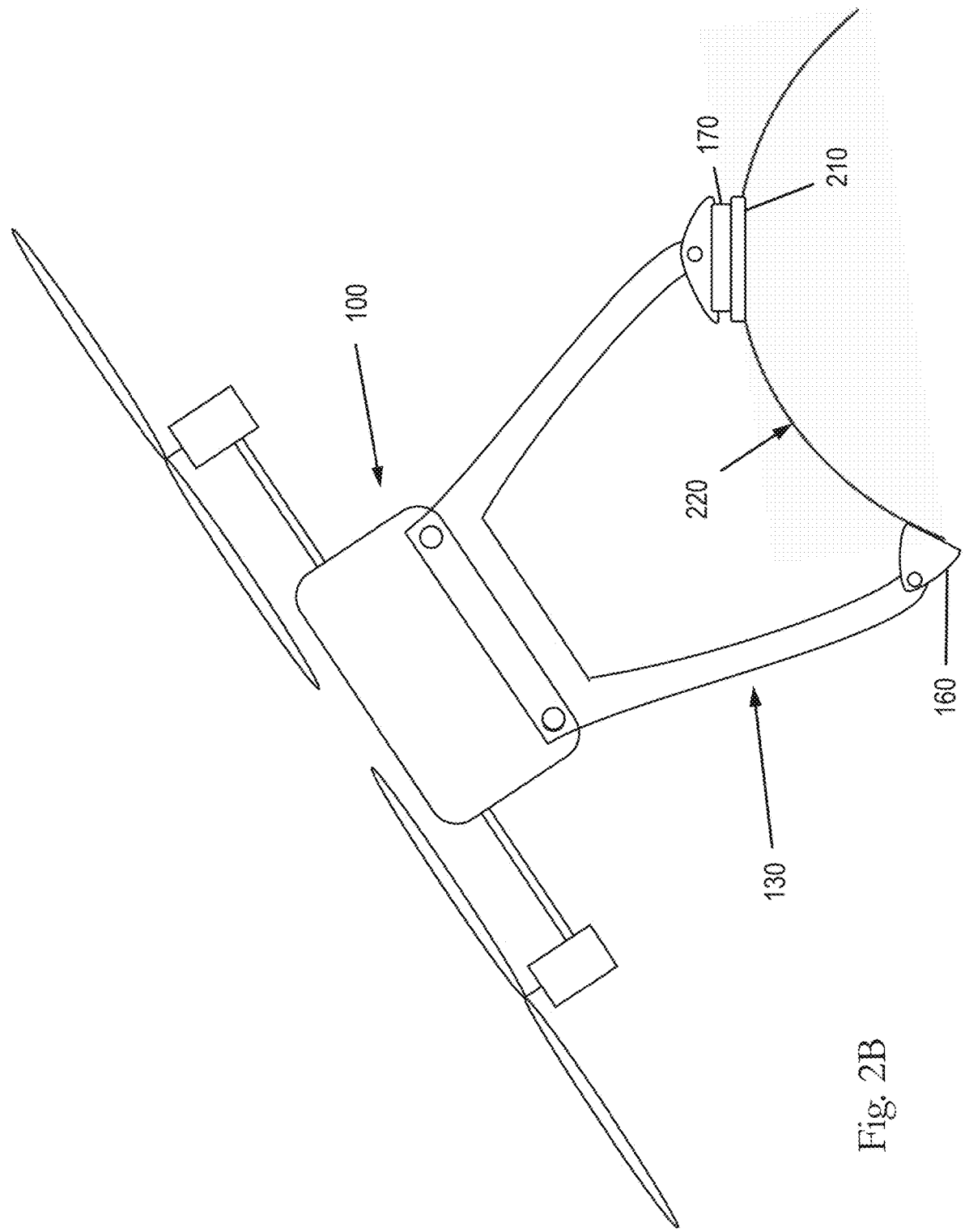

FIG. 2B illustrates UAV 100 in an alternate position for reading sensor 210 on surface 220 according to an example implementation of the present disclosure. As shown in FIG. 2B, sensor scanning device 170 is positioned near sensor 210 in order to activate sensor 210 and to receive data read from sensor 210. For maintaining the close proximity and/or alignment between sensor scanning device 170 and sensor 210, UAV 100 is lowered towards structure 200 until magnet 160 is adhered to surface 220. The magnetic connection between magnet 160 and surface 220 stabilizes UAV 100 and allows for extended communications between sensor scanning device 170 and sensor 210—for example, for diagnostics and/or trouble shooting. In accordance with an example implementation, magnet 160 is an electromagnet that remains deactivated as UAV 100 approaches sensor 210 until signal 230 is detected. Once signal 230 is detected by sensor scanning device 170, thus confirming close proximity with sensor 210, magnet 160 is activated to magnetically latch arm 140 onto surface 220 to prevent UAV 100 from any further movement. Advantageously, UAV 100 is prevented from latching to surface 220 in a slightly wrong position without proper proximity and/or alignment between sensor 210 and sensor scanning device 170.

Alternatively, in an example implementation where UAV 100 includes one magnetic 160, the attachment of magnetic 160 to surface 220 fixes at least one plane of movement of UAV 100 so that fine adjustments can be made for aligning sensor scanning device 170 with sensor 210, if needed. In some implementations, the propulsion system (e.g., rotors) of UAV 100 can be temporarily deactivated while magnet 160 is attached to surface 220 to conserve energy and to thereby prolong the operating cycle of UAV 100. Once a valid reading from sensor 210 is received from sensor scanning device 170 and confirmed by code executing locally on the UAV, the propulsion system (e.g., rotors) of UAV 100 is activated and/or magnet 160 is deactivated to detach UAV 100 from surface 220. In one example implementation, magnet 160 is an electromagnet that is activated and deactivated by a controller (not shown). In another implementation, the propulsion system of UAV 100 can be activated with sufficient force to detach a permanent magnet 160 from surface 220. In such an implementation, magnet 160 provides a total magnetic adhesion that is more than the weight of UAV 100 in order to hold it stably but less than the maximum combined thrust force of the propellers to allow for detachment by the propulsion system. In an example implementation, plural magnets (160) on respective legs (140) provide the total magnetic adhesion that is sufficient to stabilize UAV 100 while being less than the thrust force of the propulsion system of UAV 100. It is noted that permanent magnets require less force to detach by tilting than by pulling in a direction that is perpendicular to a surface. Accordingly, in an example implementation, the propellers of UAV 100 are operated at different speeds to impart a torque on the whole vehicle body of UAV 100 and, thus, on the magnetic leg(s) (140) to detach it (them) from surface 220. In one implementation, the torque is applied in a direction orthogonal to the one or more directions of articulation of the magnetic leg(s) (140) in order to detach from surface 220. In another implementation, the torque is applied beyond the articulation range of the magnetic leg(s) (140) in order to detach from surface 200.

Figure 2C:
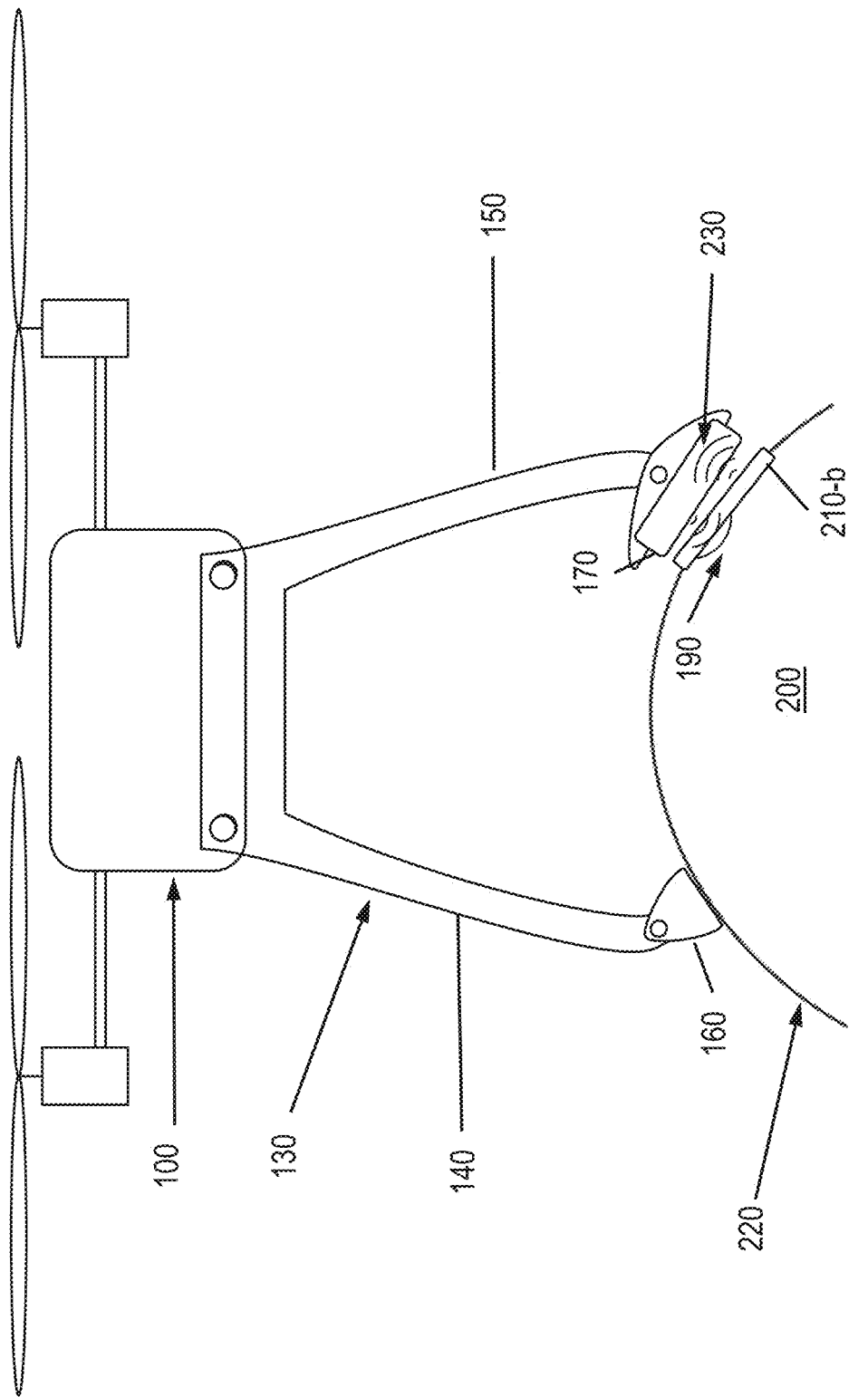

FIG. 2C is a profile illustration of UAV 100 reading a sensor 210-*b* that is disposed on a side portion on surface 220 of structure 200 according to an example implementation of the present disclosure. As illustrated in FIG. 2C, sensor 210-*b* is disposed between a 1 o'clock position and a 2 o'clock position on surface 220. Accordingly, UAV 100 is lowered to place sensor scanning device 170 near sensor 210-*b*. In the course of doing so, magnet 160 is adhered to surface 220 at an opposing side near a top portion (e.g., between a 10 o'clock and an 11 o'clock position) of structure 200, which provides improved stability for UAV 100 as it aligns sensor scanning device 170 with sensor 210-*b*. Advantageously, the magnetic connection between magnet 160 and surface 220 fixes at least one plane of movement to better enable the UAV 100 to align sensor scanning device 170 with sensor 210-*b*, thus improving the speed and accuracy of the operation and the efficiency of UAV 100 for reading large numbers of sensors (210). As with the position illustrated in FIG. 2B, the propulsion system (e.g., rotors) of UAV 100 can be temporarily deactivated while magnet 160 is attached to surface 220 until a valid reading is received from sensor 210-*b* to conserve energy and to thereby prolong the operating cycle of UAV 100. Once a valid reading from sensor 210-*b* is received and confirmed via sensor scanning device 170, the propulsion system (e.g., rotors) of UAV 100 is activated (and/or magnet 160 is deactivated) to detach UAV 100 from surface 220.

Figure 2D:
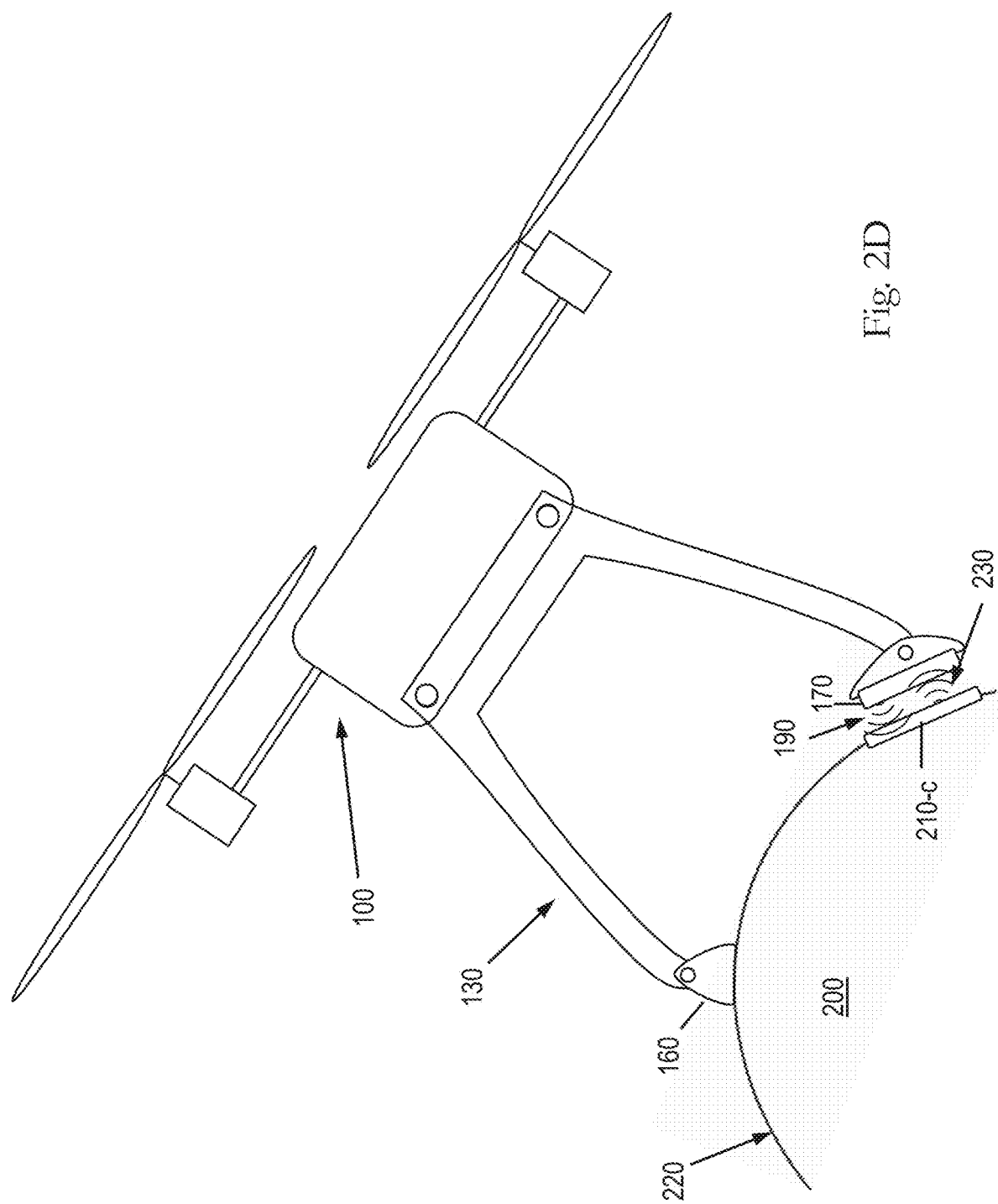

FIG. 2D is a profile view corresponding to FIGS. 2B and 2C to illustrate an angled orientation of UAV 100 for reading a sensor 210-*c* that is disposed at a lower part of a side portion (e.g., between a 2 o'clock position and a 3 o'clock position) on surface 220 of structure 200. As illustrated in FIG. 2D, UAV 100 can be temporarily attached to surface 220 to place sensor scanning device 170 proximate sensor 210-*c* while UAV 100 is in an angled orientation—e.g., not horizontally level. In an example implementation, the tolerance for the angled orientation of UAV 100 while reading a sensor (210) on a structure (200) (degrees from horizontally level or "horizon") is increased based on the height of structure 200 and/or clearance from surrounding obstructions. The tolerance is determined based on whether UAV 100 is able to launch from the angled orientation (as illustrated in FIG. 2D) without colliding into any surrounding structures or the floor of the facility.

FIG. 2E is a perspective view corresponding to FIG. 2C of UAV 100 on structure 200 (for example, a pipe), with UAV 100 having sensor scanning device 170 for activating and reading sensor 210-*b*. In FIG. 2E, the UAV 100 utilizes three (3) articulated magnets 160 (such as permanent magnets or switchable permanent magnets). To accommodate the landing of the UAV 100 on structure 200, each of the magnets 160 (or more precisely, its magnetic field) articulates with a perpendicular orientation with respect to structure 200 while sensor scanning device 170 on a fourth leg is aligned with sensor 210-*b*. In an example implementation, sensor scanning device 170 is also articulated with a perpendicular orientation with respect to sensor 210-*b* (e.g., as illustrated in FIG. 2C).

In some implementations, the magnetic fields of the articulated magnets 160 are actively switchable on and off (e.g., to allow for easy detachment after job completion). As illustrated in FIG. 2E, a laser scanner 240 (e.g., light detection and ranging, or LIDAR) is included in order to measure, for example, the relative location of structure 200 with respect to UAV 100 during a landing maneuver as a form of real-time feedback.

In an example implementation, the UAV 100 includes a body constructed to enable the UAV 100 to fly (e.g., having rotors, control and guidance devices, and the like). The UAV 100 also includes two or more legs connected to the body and configured to temporarily attach the flying UAV 100 on a curved ferromagnetic surface 220. Each leg includes a top (or main) portion connected to the body and a bottom portion. The bottom portion of one of the two or more legs includes sensor scanning device 170 and the bottom portion of the other one or more legs includes a permanent magnet 160. The bottom portion with magnet 160 is configured to magnetically attach the leg to the ferromagnetic surface 220. In addition, a passive articulation joint connects the top and bottom portions of the leg, and passively articulates (e.g., pivots) the bottom portion with respect to the top portion in response to the bottom portion approaching the ferromagnetic surface 220 during the landing.

In different implementations, different landing mechanisms of the UAV 100 can be used. These can include different types of adhesion mechanisms such as magnetic or non-magnetic. Examples of magnetic landing mechanisms include magnets that can be shut-off or overcome by a mechanical means during takeoff from structure 220. Such magnets include switchable permanent magnets, permanent magnets with an actuated leverage to aid in detachment during takeoff, electro-permanent magnets, and electromagnets. It should be noted, however, that continuous power consumption can be a disadvantage for electromagnets. Non-magnetic adhesion mechanisms can be used for non-ferromagnetic surfaces such as stainless steel, composite pipes, and concrete walls. Such mechanisms include microspines, dry gecko-inspired adhesives (e.g., synthetic setae), suction cups, grippers, and claws.

FIG. 3A is a profile view illustration of a UAV 300 that incorporates an alternative undercarriage 330 for accommodating a sensor scanning device 370 according to an example implementation of the present disclosure. As illustrated in FIG. 3A, undercarriage 220 includes a height adjustment mechanism 340 (for example, a motor or other actuator) for lowering sensor scanning device 370 from UAV 300 to sensor 210 disposed on surface 220 or for raising sensor scanning device 370 from sensor 210 to UAV 300. An attachment mechanism 350 connects the height adjustment mechanism 240 to a housing 360 of sensor scanning device 370. The housing 360 of sensor scanning device 370 comprises an engagement element (such as a bolt head) 365 for detachably engaging (e.g., hooking to) attachment mechanism 350. Advantageously, undercarriage 330 is a modular element that is also applicable to a mobile crawler (not shown), where the crawler is able to disengage (e.g., drive away from) UAV 300 via attachment mechanism 350, which can be adapted to serve as a docking mechanism for the mobile crawler. Thus, the mobile crawler can be deployed on surface 220 and can re-engage (e.g., drive into or onto) UAV 300 when ready to leave surface 220 via attachment mechanism 350, such as to return to a home base or other structure or component to be inspected or maintained. Attachment mechanism 250 can also allow for information or energy transfer between the UAV 300 and sensor scanning device 370. For example, attachment mechanism 250 can incorporate one or more data connections to download sensor reading data received by sensor scanning device 370 via sensor reading (e.g., EM) signal 230 from sensor 210 to the UAV 300. Additionally, attachment mechanism 250 can include one or more power connections to supply power to sensor scanning device 370 from UAV 300 for transmitting sensor activation signal 190. In one example implementation, a battery (not shown) of UAV 300 is coupled to sensor scanning device 370. U.S. patent application Ser. No. 16/689,864, now pending, filed on Nov. 20, 2019 and entitled "Perching UAV With Releasable Crawler," which is hereby incorporated by reference, includes disclosure on a UAV having an undercarriage that can comprise the undercarriage 330 as it is suitable for accommodating a releasable mobile crawler.

In some implementations, the height adjustment mechanism 340 is provided and used to adjust the height of the sensor scanning device 370 relative to the surface of the structure 200. For example, the adjustment can be made based on the pipe diameter of structure 200 (e.g., to ensure that sensor scanning device 370 is sufficiently close to sensor 210 for signals 190 and 230). In this regard, on large pipes (or flat surfaces), the height of sensor scanning device 370 from a sensor (210) disposed on a surface (220) of the pipe (200) can be established as being greater than when UAV 300 is on a small diameter pipe. As such, for large pipes (or flat surfaces), sensor scanning device 370 is deployed to a lower height to reach surface 220, whereas on a small diameter pipe, sensor 210 can be activated and read from a higher point.

In some implementations, the height adjustment mechanism 340 is actuated, such as with a motor. In some implementations, the height adjustment mechanism 340 is passive when it is not used for lowering sensor scanning device 370. For example, in one such implementation, the height adjustment mechanism 340 is spring-loaded so that it can always be at maximum possible extension to press against surface 220 of structure 200 so that the distance between sensor 210 and sensor scanning device 370 is minimized when UAV 300 is proximate or adhered to surface 220.

In the UAV 300 with undercarriage 330, approaching and landing close to the top of the pipe 150 (e.g., 12 o'clock or near 12 o'clock position) with a straight or near straight angle is desirable. As with UAV 100, UAV 300 incorporates one or more legs 140 that includes an articulated magnet 160 (such as a permanent magnet or a switchable permanent magnet) at a bottom portion thereof. Legs 140 have features useful for successful adhesion of UAV 300 to structure 200. In one example implementation, the articulation of leg 140 is passive in that the articulated magnet 160 is designed to articulate about the axes shown in FIG. 3A in response to the magnetic attraction of the magnet 160 and the ferromagnetic surface 220 when the UAV 300 (or more precisely, the attached undercarriage 330) is in close proximity to the target ferromagnetic surface 220, such as in response to initial contact between the two.

Figure 3B:
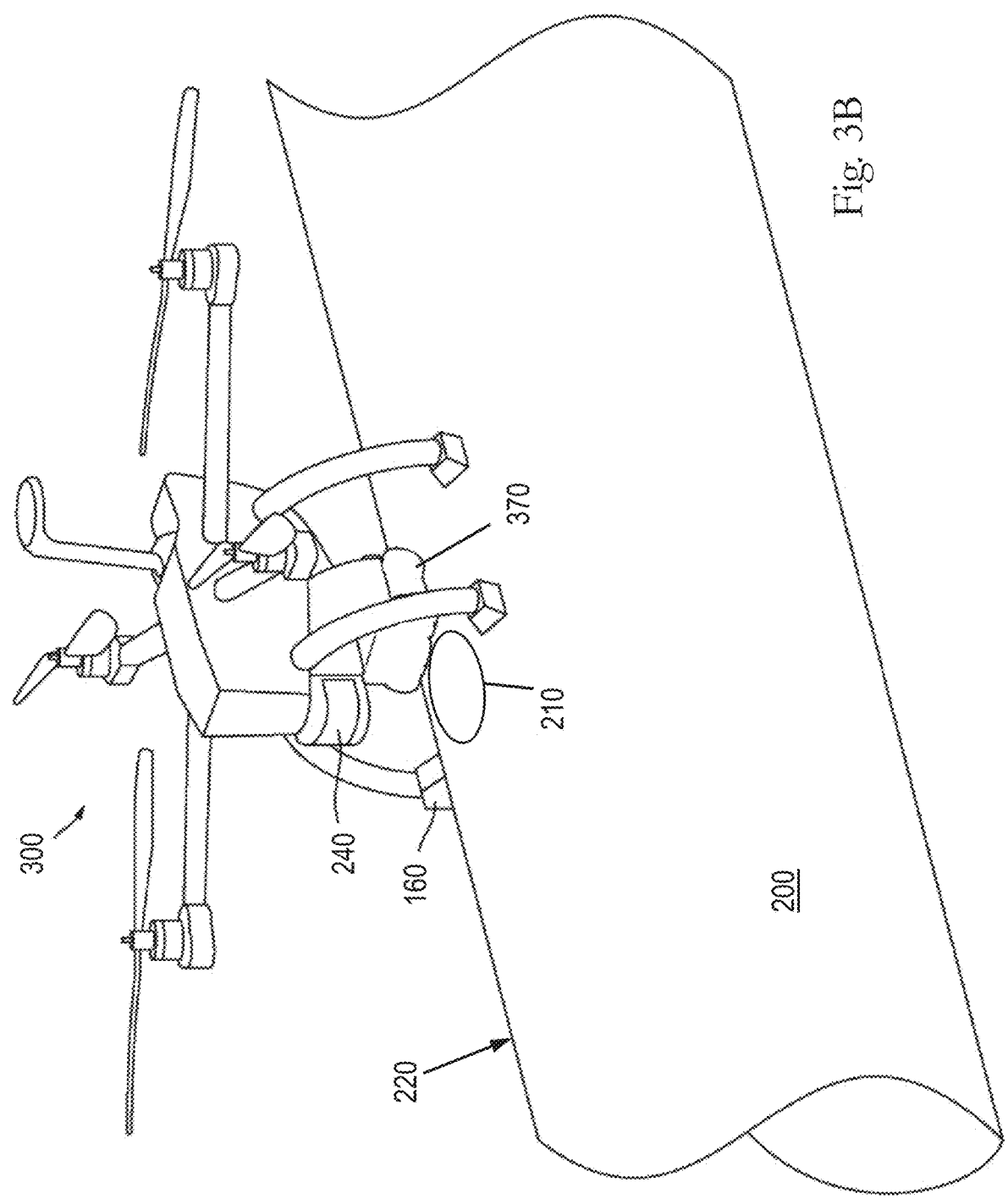
FIG. 3B is a perspective view corresponding to FIG. 3A of the UAV on structure (for example, a pipe), with the UAV having a sensor scanning device for activating and reading a sensor disposed on a surface of the structure.

FIG. 3B is a perspective view corresponding to FIG. 3A of UAV 300 on structure 200 (for example, a pipe), with UAV 300 having sensor scanning device 370 for activating and reading sensor 210. In FIG. 3B, the UAV 300 utilizes four (4) articulated magnets 160 (such as permanent magnets or switchable permanent magnets). To accommodate the landing of the UAV 300 on structure 200, each of the magnets 160 (or more precisely, its magnetic field) articulates with a perpendicular orientation with respect to structure 200 while sensor scanning device 370 is aligned with sensor 210.

With the relative orientations of the propulsion systems (e.g., rotors) of UAVs 100 and 300 and sensor scanning device 170 and 370, respectively, sensors (210) that are disposed on a bottom portion of structure 200 can present difficulties to access. A significant challenge in inspecting pipes in refineries is that many of the pipes are not accessible from the top because of obstacles, such as racks, structures, and other pipes. In these cases, accessing or placing sensors (210) on such surfaces (220) from other positions, such as from the side or bottom of the structure (220), is desirable. Accordingly, a rotatable and/or top/side-oriented undercarriage on a UAV is provided according to example implementations of the present disclosure for reading such sensors (210), as described below with reference to FIGS. 4A, 4B, 5A, 5B, and 5C.

Figure 4A:
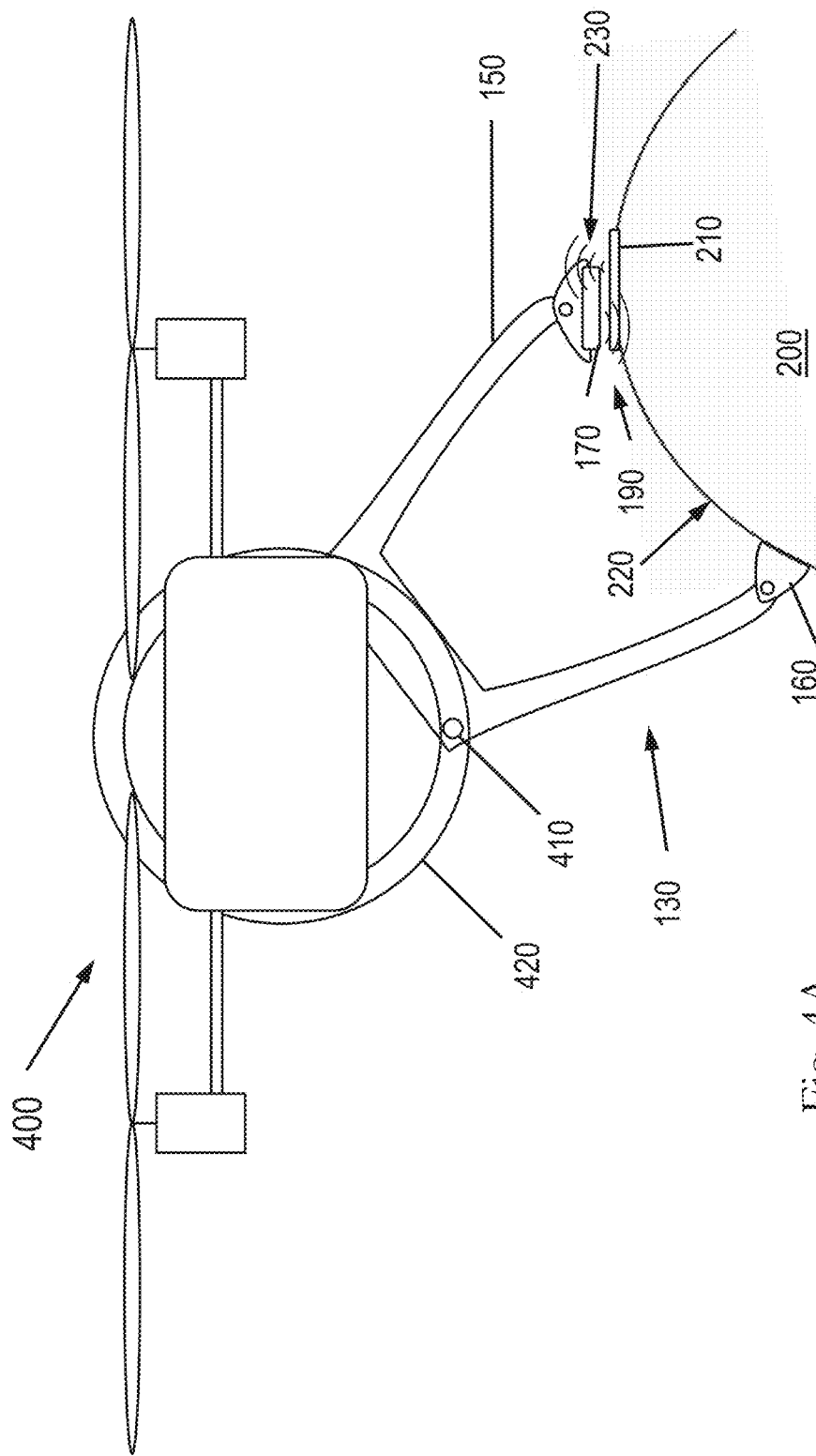
FIGS. 4A and 4B are profile views of an example UAV having rotatable mounting points for attaching the undercarriage of FIGS. 1 through 2D, together with the attached undercarriage at bottom and top orientations, respectively, with respect to the UAV according to an example implementation.
Figure 4B:
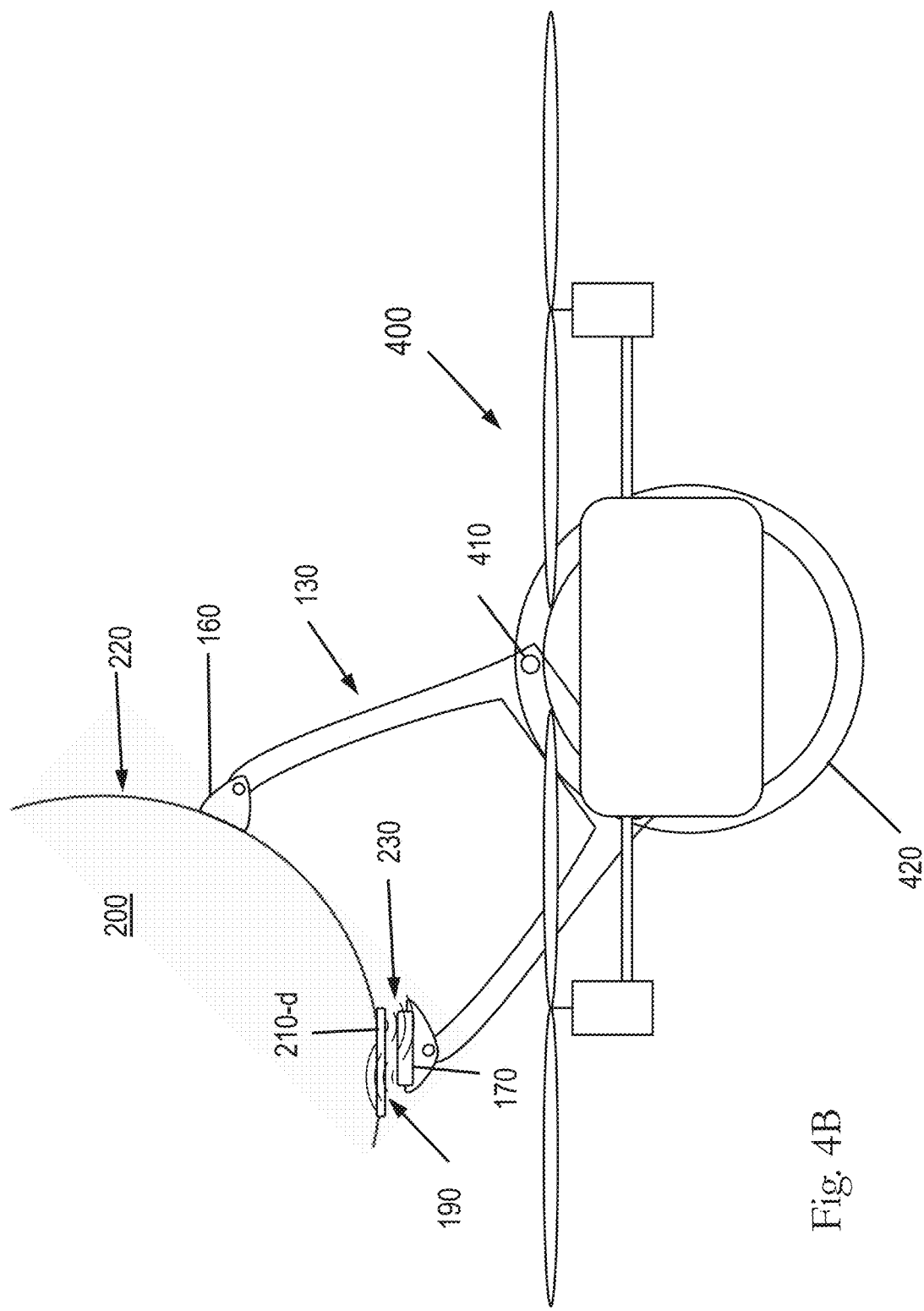

FIGS. 4A and 4B are profile views of an example UAV 400 having rotatable mounting points 410 for attaching the undercarriage 130 of FIGS. 1 through 2D, together with the attached undercarriage 130 at bottom and top orientations, respectively, with respect to the UAV 400 according to an example implementation. In some implementations, UAV 400 includes a motor or actuator (not shown) for rotating mounting points 410 to a suitable orientation, including during flight (e.g., dynamic rotation). In some other implementations, the mounting points 410 can be manually rotated to a desired orientation prior to a mission (e.g., static rotation).

In an example of a motorized implementation, the motorized system provides for dynamically changing the orientation of the undercarriage 130, either by an operator controlling UAV 400 or by a preprogrammed algorithm. In this arrangement, motorized mounting points 410 and a motor are employed to rotate the mounting points 410 circumferentially about the UAV 400. Accordingly, UAV 400 can automatically change the orientation of undercarriage 130 (e.g., during flight) depending on factors such as observed or otherwise known obstacles. In an example implementation of the present disclosure and as illustrated in FIGS. 4A and 4B, the orientation of undercarriage 130 is adjustable in accordance with the locations of sensors 210 and 210-*d*, respectively, around structure 220 so that UAV 400 is capable of approaching structure 200 from directions until sensor scanning device 170 completes communications with sensors 210 and 210-*d* and/or magnet 160 attaches to surface 220.

For example, in one implementation, UAV 400 has a controller within the device configured to plan the respective orientations of sensors 210 and 210-*d* during an inspection run to determine whether to attach to a top portion (FIG. 4A) or a bottom portion (FIG. 4B) of structure 200, or somewhere in between. The controller can be configured by computer code executing in a local hardware processor. In the example motorized implementation shown in FIGS. 4A and 4B the rotation is achieved through a circular rail 420 around the body of UAV 400. As such, to maintain a reasonable center of mass during rotation, heavy components such as batteries can be placed on rail 430 to serve as counterweights. In a particular arrangement, the components which are being employed as counterweights can be at opposing positions to the mounting points 410.

In an example manual implementation, the rotation of the undercarriage 220 is manually adjusted by a user instead of being motorized. For instance, this can be done to save weight, complexity, power, or the like. An example technique for accomplishing this manual adjustment is by releasing screws (not shown) to unlock manual rotation of undercarriage 130 about circular rail 430, which can then be relocked once the undercarriage 130 is in the desired position.

Advantageously, especially for a dynamic rotation implementation, UAV 400 can rotate undercarriage 130 throughout the course of an inspection run to communicatively mate with various sensors 210 and 210-*d* that can be oriented differently on the structure 200 while maintaining a level flight. In the illustrated orientation of FIG. 4B, for example, UAV 400 approaches upward from under structure 200 to maintain level flight and to keep clear from structure 200.

Figure 5C:
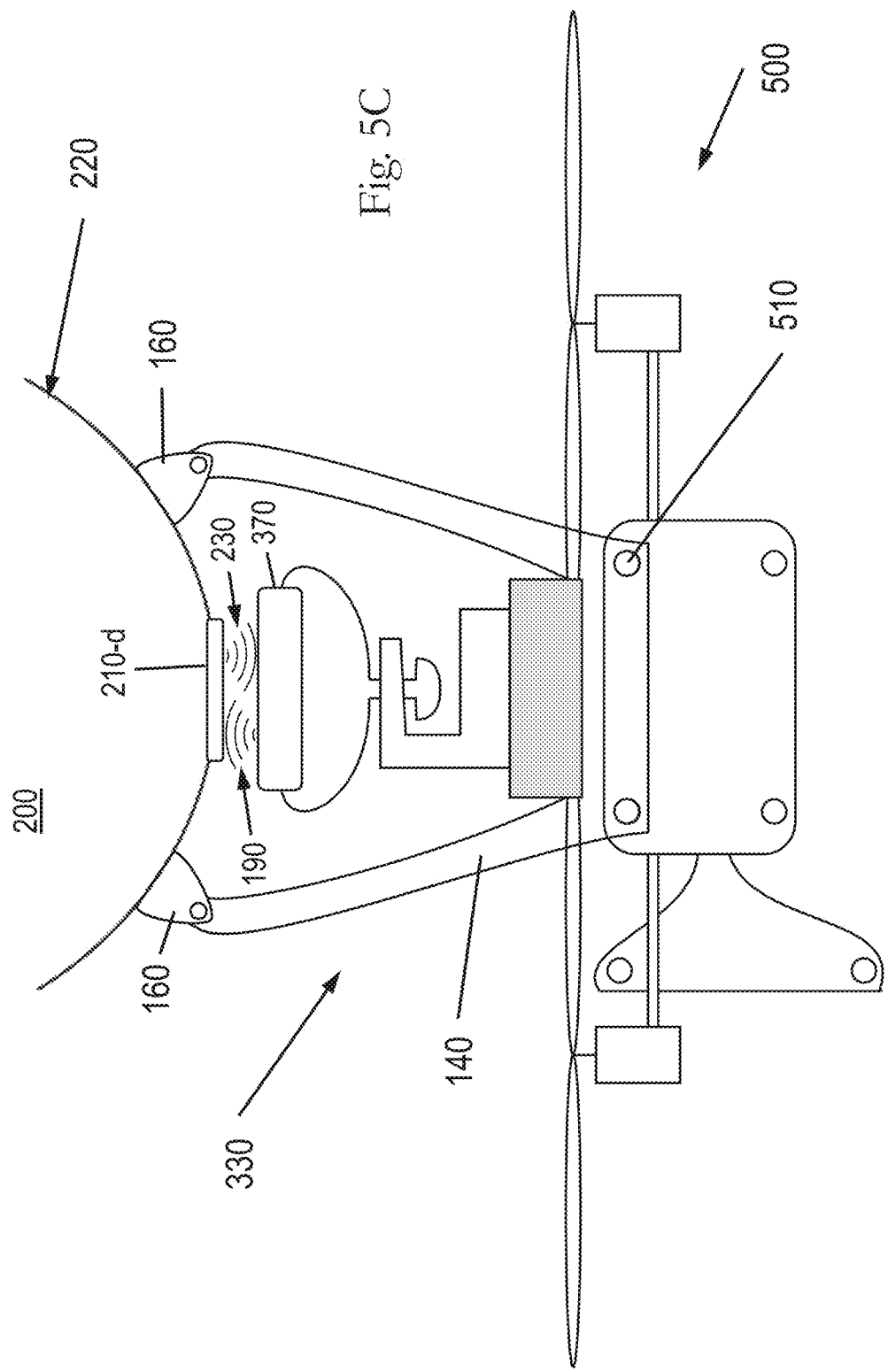

FIG. 5A is a profile view of an example UAV 500 having modular mounting points 510 for attaching the undercarriage 330 of FIGS. 3A and 3B, while FIGS. 5B and 5C are profile views of the UAV 500 with the attached undercarriage 330 at side and top orientations, respectively, with respect to the UAV 500, according to an example implementation of the present disclosure. This modular approach allows for mounting the undercarriage 330 (payload) on, for example, the bottom, front, or top of the UAV 500 to allow for reading sensors 210, 210-*d*, and 210-*e* on the top, bottom, or side portions, respectively, of structure 220. Accordingly, UAV 500 arranged in different orientations (e.g., as illustrated in FIGS. 5B and 5C) can be used for specific structures (200) or portions of a structure (200) where surrounding obstructions are such that sensors (210) can only be placed on a particular (e.g., side or bottom) portion of the structure (200).

It is noted that for ease of 2D side view illustrations in FIGS. 4A through 5C, features like the rotors of the UAV 400/500 are sometimes shown as contacting other parts of the UAV 400/500. However, this is because the depth dimension (in which such features would not overlap) is not illustrated. The rotors of the UAV 400/500 do not obstruct the undercarriage 220 in any configured orientation of the undercarriage 130/330. In other words, the undercarriage 130/330 is between the rotors when viewed from above.

It should be appreciated that changing the location of the undercarriage 130/330 can change the center of mass for the UAV 300. In some implementations, an onboard flight controller (not shown) for the UAV 400/500 is configured (e.g., by logic, code, or the like) to keep the UAV 400/500 in a stable hover regardless of weight distribution. For example, if the UAV 400/500 becomes forward heavy, then the controller is configured to sense the slightest tilt and compensate for that by increasing the thrust or rotation speeds of the rotors on the heavy side to keep the UAV 400/500 level and stable. In implementations such as illustrated in FIGS. 4A and 4B, to reduce the effect of a changing center of mass, heavy components within the UAV such as batteries can be located on rotating rail 420 in opposition to undercarriage 130. This makes it easier for the flight controller to keep the UAV 400 stable during situations where the undercarriage 130 is not directly below the UAV 400. It is further noted that undercarriages 130 and 330 are used interchangeably with UAVs 400 and 500 according to example implementations of the present disclosure.

In accordance with an example implementation of the present disclosure, the UAV (100/300/400/500) is controlled via a preprogrammed autonomous algorithm and/or an operator via a remote control apparatus (not shown) to approach, hover over, and/or align with sensors (210). In some implementations, the preprogrammed algorithm includes instructions for a controller (not shown) to control and navigate UAV (100/300/400/500) using a camera (and/or a light detection and ranging (LIDAR) assembly, e.g., 240 in FIGS. 2E and 3B). In an example implementation, UAV 100 incorporates a controller (not shown), a camera (not shown), and a LIDAR assembly (240) according to the disclosure in U.S. Pat. No. 11,235,823, which is based on Ser. No. 16/696,085, filed on Nov. 26, 2019 and entitled "Automation Methods For UAV Perching on Pipes," which is hereby incorporated by reference. Accordingly, each sensor (210) includes a visual marker (not shown), such as a QR code or an April tag, and UAV (100/300/400/500) or undercarriage 130/330 includes an externally facing camera (not shown) that can be used to detect and recognize the visual markers for navigating UAV (100/300/400/500) through sensors (210) that are disposed throughout a facility. Additionally, each sensor (210) can include a wireless beacon (not shown), which employs a short-range wireless protocol, such as ultra-wide band (UWB) or low-energy Bluetooth to assist in locating the sensors 210. Correspondingly, a wireless location sensor (not shown) can be disposed on UAV (100/300/400/500) or undercarriage 130/330 to determine the locations of the sensors (210) in response to the wireless beacons. In an example implementation, a wireless sensor for detecting the wireless beacons is integrated with sensor scanning device 170. For sensors (210) that incorporate a wireless beacon, a power source is needed to power the wireless beacon even before UAV (100/300/400/500) reaches the sensor (210)—in other words, before sensor scanning device 170 can power the sensor (210). Suitable power sources include integrated solar cells, energy harvesting devices (e.g., transducers on pipe vibrations), or long-term energy storage, such as a small battery that can be quickly recharged during the wireless activation by sensor scanning device 170.

In accordance with an example implementation, a visual marker (e.g., QR code) and/or a wireless beacon, as described above, contains identification and location information for a respective sensor (210), such as a tag number, location coordinates, asset information, etc., which aids in identification and storing collected inspection data under the appropriate database entries. According to one example implementation, each sensor (210) incorporates an RFID (radio frequency identification) tag (not shown) for the aforementioned identification information and sensor scanning device 170 incorporates an RFID reader (not shown) adapted to retrieve the identification and/or location information for each sensor (210) from the RFID tag.

Accordingly, UAV (100/300/400/500) is capable of autonomously determining the locations of the sensors (210) in 3D (three-dimensional) space. In an example implementation, UAV (100/300/400/500) navigates among multiple sensors (210) disposed in a facility in an ordered sequence that is predetermined based on operational efficiency for UAV (100/300/400/500) and/or inspection point priorities. In one example implementation, a method of navigating UAV (100/300/400/500) through plural locations in a facility conforms to the disclosure in U.S. Patent Publication No. 2020-0174478 A1, which corresponds to U.S. patent application Ser. No. 16/694,092, filed on Nov. 25, 2019 and entitled "Inspection Method Using a Perching UAV With a Releasable Crawler," which is hereby incorporated by reference. According to an example implementation, different sensors (210) are inspected at different periods where UAV (100/300/400/500) inspects different subsets of sensors (210) at a particular facility at different times and/or frequencies. In some implementations, autonomous navigation can also be performed by storing the coordinates of each sensor (210) and navigating UAV (100/300/400/500) to them based on the stored coordinates—either in an onboard memory (not shown) on UAV (100/300/400/500) for retrieval by the controller (not shown) of UAV (100/300/400/500) or in a network storage (not shown) that is accessible to the controller of UAV 100 via a network communication, either during an inspection or when docked between inspections.

As noted above, UAV 300/500, or undercarriage 330, can include a detachable/releasable crawler (as described in U.S. Patent Publication No. 2020-0172184 A1 entitled "Crawler Vehicle With Automatic Probe Normalization," and U.S. Patent Publication No. 2020-0172232 A1 entitled "Perching UAV With Releasable Crawler," each of which is hereby incorporated by reference in its entirety. The detach crawler (not shown), in one example implementation, carries a sensor scanning device (not shown) that corresponds to sensor scanning device 370. The crawler also includes a camera and/or a wireless sensor for navigating among sensors (210) on surface 220 while UAV 300/500 is paused (hovering or attached at a location on surface 220) near the sensors (210). Thus, UAV 300/500 can navigate through a series of checkpoints (which can be identified by corresponding visual and/or wireless markers) and pause at these checkpoints for deploying the crawler towards respective sensors (210) in the proximities of the checkpoints. In another example implementation, a remote control apparatus (not shown) of an operator incorporates a display for showing a camera feed from UAV (100/300/400/500) or undercarriage 130/330 (and/or a detachable crawler) to allow the operator to navigate without requiring a line of sight to UAV (100/300/400/500) (or the detachable crawler).

Figure 6:
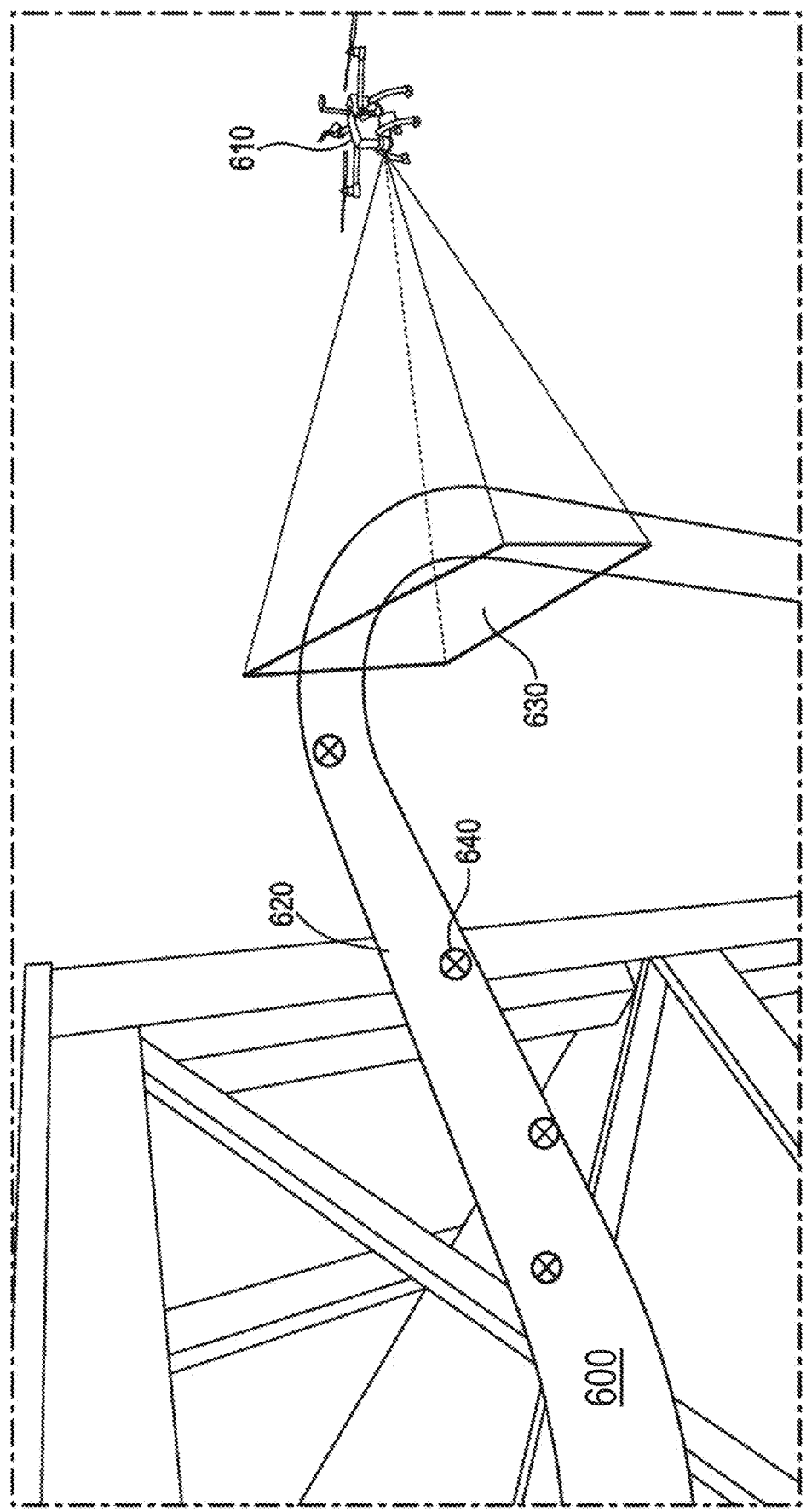
FIG. 6 is an illustration of sensors each incorporating a marker on a structure encountered during inspection or maintenance of the structure, together with an example UAV detecting the markers according to an example implementation.

FIG. 6 is an illustration of sensors (210) each incorporating a marker 640 (e.g., visual or radio) on a structure (e.g., pipe surface 620) encountered during inspection or maintenance of the structure, together with an example UAV 610 detecting the markers 640 according to an example implementation. The aforementioned U.S. Patent Publication No. 2020-0174478 A1 discloses inspection methods for a UAV that incorporates a releasable crawler for leaving visual markers of inspection points, which disclosure is hereby incorporated by reference. In FIG. 6, sensor inspection points 640 (e.g., QR codes placed atop, or radio markers) incorporate with sensors 210 that are installed on surface 620 of structure 600) for identification by the UAV 610. Identification by the UAV can be using image processing of information captured through camera view 630 as sensed by the UAV 610.

The UAV 610 is programmed to use an on-board RGB-D camera (with view 630) (or a radio transceiver) to detect the markers 640 and compute (or otherwise determine) their locations with respect to the UAV 610. Using the UAV's GPS position, the UAV 610 is further programmed to compute (or otherwise determine) absolute locations of the markers 640 from these detections to thereby approach and activate/read the corresponding sensors (210).

Figure 7:
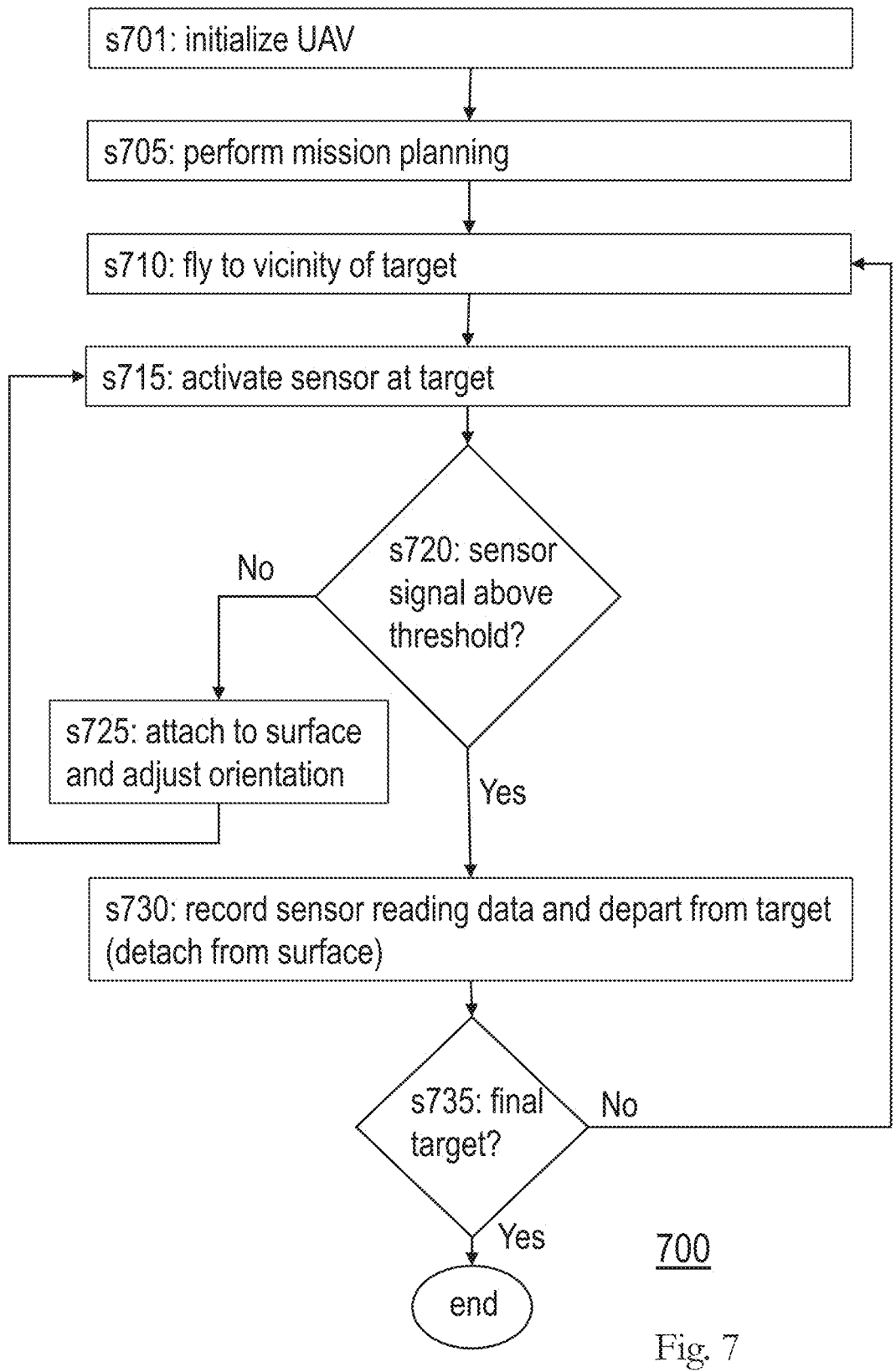
FIG. 7 is a flow chart of an example inspection method of a target structure with passive UT sensors installed throughout surface locations using a UAV with an onboard sensor scanning device according to an example implementation of the present disclosure.

FIG. 7 is a flow chart of an example inspection method 700 of a target structure (e.g., 200 and 600) with passive UT sensors (210) installed throughout surface (220 and 620) locations using a UAV (100/300/400/500/610) with an onboard sensor scanning device (170/370) according to an example implementation of the present disclosure. As illustrated in FIG. 6, each sensor (210) can incorporate a visual marker (e.g., 640) and/or a radio beacon for detection by the UAV (100/300/400/500/610). According to an example implementation, method 700 can be programmed or encoded in, for example, system software in order to automate the process steps therein as much as possible. In an example implementation, method 700 is performed with one or more of autonomous, manual, and mixed flight guidance mode, as disclosed in the aforementioned U.S. Patent Publication No. 2020-0174478 A1.

Some or all of the steps of method 700 can be performed using components and techniques illustrated in FIGS. 1A through 6. Portions of this and other methods disclosed herein can be performed on or using a custom or preprogrammed logic device, circuit, or processor, such as a programmable logic circuit (PLC), computer, software, or other circuit (e.g., ASIC, FPGA) configured by code or logic to carry out their assigned task. The device, circuit, or processor can be, for example, a dedicated or shared hardware device (such as a laptop, a workstation, a tablet, a smartphone, part of a server, or a dedicated hardware circuit, as in an FPGA or ASIC, or the like), or computer server, or a portion of a server or computer system. The device, circuit, or processor can include a non-transitory computer readable medium (CRM, such as read-only memory (ROM), flash drive, or disk drive) storing instructions that, when executed on one or more processors, cause portions of the method 900 (or other disclosed method) to be carried out. It should be noted that in other implementations, the order of the operations can be varied, and that some of the operations can be omitted. Some or all of the steps of method 700 can also be performed using logic, circuits, or processors located on a UAV configured to carry out the method 700.

As illustrated in FIG. 7, method 700 initiates with step s701 where the UAV (e.g., 610) with sensor scanning device (170/370) is initialized and prepared for an inspection mission. In an example implementation, step s701 includes placing UAV (610) in a designated takeoff (and landing) location, powering it on and performing preflight checks and initialization. In example implementations, the checks can include, but are not limited to: checking the battery health of the UAV (610), checking that the propulsion system works as expected, checking communications between the operator's control station and the UAV (610), checking the functionality of surface attachment (magnet(s) 160) and orientation (e.g., rotating rail 420) mechanisms, checking and calibrating sensor scanning device (170/370), installing the rotors or propellers on the UAV (610), setting the UAV (610) in position mode (e.g., in order to stabilize its position in the air), enabling obstacle avoidance mode (e.g., in order to enable the UAV (610) to navigate the environment safely during its autonomous mission through the waypoints), and selecting the flight guidance mode of the UAV (610) (e.g., to manual, autonomous, or mixed mode, where some waypoints are navigated autonomously and some waypoints are navigated manually). Each of these checks is performed by probing the current, voltage, resistance, reactance, and other electrical and mechanical parameters against values stored locally on the UAV using a processor programmed by code for such comparisons. Signals from the device under test for the preflight checks and other checks are compared to stored values to determine whether the signals have a prescribed value or are within a prescribed range of values.

Next, method 700 proceeds to a mission planning step s705, which differs depending on factors such as the type of flight guidance mode. In one implementation, autonomous guidance mode is selected (where the UAV (610) is programmed to fly autonomously to the different waypoints). Here, the operator defines waypoints and the associated actions (e.g., a takeoff waypoint at predefined altitude, a sensor approach waypoint at a predefined distance from the target 640, and failsafe waypoints in case unplanned events take place). In addition, in one implementation, the mission planner provides estimates on the expected mission times. For example, this can be based on the estimated power consumption given the input mission plan by the operator (e.g., estimated time of flight to and from the target 640, estimated maximum time of the inspection operation, and the like).

In another implementation, manual guidance mode is selected. Here, the operator plans a mission by visually identifying the best and safest path to fly from a take-off point towards the vicinity of the inspection target 640. In addition, in one implementation, the mission planner plans expected mission times to have enough battery life for a return to home. For example, the mission planner can set geofence limits that should not be exceeded during manual operation.

In yet another implementation, mixed guidance mode is selected. This is similar to autonomous mode (where a mission is fully planned on the control station) but differs by allowing the operator to select some of the waypoints to be navigated manually (e.g., in case obstacles or a difficult environment lies ahead of the UAV (610) on the way to that waypoint). This is useful, for example, when the operator's confidence in automated flight is not high enough for a particular waypoint.

The flight mission is initiated by method 700 proceeding next to step s710 and flying the UAV (610) to the vicinity of an inspection target 640 (sensor 210). In an example autonomous guidance mode implementation, this includes commanding the UAV (610) to go to the takeoff waypoint, and commanding the UAV (610) to go to the sensor approach waypoint (e.g., in the vicinity of the inspection target 640). For example, in one implementation, the UAV (610) is configured (e.g., programmed) to automatically transition from one mission waypoint to the next, while in another implementation, the UAV (610) is configured to wait for operator confirmation each time it arrives at a waypoint before proceeding to the next. In an example manual guidance mode implementation, this includes manually flying the UAV (610) to the vicinity of the inspection target 640 in preparation for activating and reading the corresponding sensor (210). In an example mixed guidance mode implementation, the step of initiating and flying is similar to the autonomous mode, but the operator is alerted by the system to take over when the manual portions of the mission start.

Next, at step s715, the UAV (610) activates its sensor scanning device 170/370 and transmits an activation signal (190) to one or more sensors (210) corresponding to the target 640.

Having transmitted the activation signal, the UAV (610) determines whether any return sensor signals (230) are received and, if so, whether they are above a stored threshold value or outside of a range of values (step s720). If the received sensor signal(s) (230) are not above threshold or outside of a range of values ("No"), method 700 proceeds to step s725 where the UAV (610) is commanded to further approach the sensor (210), which includes attaching to the surface (220/620) of the structure (200/600) in proximity of the target 640 to stabilize the UAV (610). The attachment to the surface (220/620) includes passively articulating legs (e.g., legs 140) of the UAV (610) toward the curvature of the ferromagnetic surface (220/620) using corresponding magnets (such as articulated magnets 160) in the legs while approaching the ferromagnetic surface. The attachment also includes magnetically attaching the articulated legs of the UAV to the ferromagnetic surface using the corresponding magnets. Thus, with at least one magnet (160) attached to the surface (220/620), the UAV (610) is stabilized against at least one plane of movement and can be maneuvered to adjust its orientation in relation to the sensor (210) on the ferromagnetic surface (220/620). In an example implementation, target detection and localization software configured (e.g., programmed) to use the defined target 640 to detect and localize the target 640 for approaching the structure (200/600) and attaching to the surface (220/620). Here, in one implementation, the operator confirms target detection and issues the attachment command. In another implementation, the UAV operates autonomously with a programmed processor reviewing signals received from onboard sensors and confirming the target based on those signals.

In an example implementation, the UAV (610) is programmed to autonomously perform the attachment in two steps. In a first step (2), the UAV (610) autonomously approaches the target 640 for attachment to the surface (220/620). In a second step (2), the UAV (610) autonomously performs a final alignment using an onboard sensor (e.g., 2D LIDAR) that, in one implementation, is also confirmed by the operator, and in another is performed autonomously much as described in the previous paragraph. In an example confirmation implementation, if positioning and final alignment are not both confirmed, the UAV (610) is commanded to fall back to a failsafe waypoint (e.g., where sensor communication is continued and attachment can be re-executed, if needed), or a mission abort can safely be commanded (to which the UAV (610) is configured to return home). In a second step (e.g., repeat of steps s715 and s720), the UAV (610) waits for sensor signal threshold to be confirmed, at which point the UAV (610) is programmed to adjust orientation until a sensor signal threshold is confirmed at step s720. If confirmation of sensor signal threshold is not indicated, the UAV (610) goes to a failsafe waypoint, where an approach can be re-executed, or a mission abort is commanded and the UAV (610) returns home).

Once sensor signal threshold is confirmed ("Yes"), method 700 proceeds to step s730, where reading data received via sensor signal (230) is recorded at the UAV (610). In one implementation, the reading data is communicated via a network connection to a remote control device, where an operator is able to confirm the sensor reading.

After reading data is successfully received from the sensor (210), method 700 proceeds to step s735 and the UAV (610) determines whether the completed target (640) is a final target in an inspection mission. If there is a next target ("No"), method 700 proceeds to step s710 and the UAV (610) is commanded to detach and fly to the vicinity of the next target (640).

In an implementation, UAV (610) is programmed or otherwise configured to monitor the overall status and provide estimates on the maximum allowed inspection time depending on, for example, the available power. In addition, the UAV (610) is further programmed to store inspection data (e.g., from sensor scanning device 170/370) continuously on an onboard system memory (not shown), and to transfer the stored inspection data to the operator control and monitoring station in real time.

If it is determined that the just completed target (640) is a final target in an inspection mission planned at step s705 ("Yes"), the method 700 concludes by detaching UAV and returning home.

In an implementation, once a sensor reading is completed at step s730, the UAV (610) transitions to a detachment state (e.g., detaches magnetically from the surface (220/620) of the structure (200/600)). In an example implementation, an operator commands the UAV (610) to go to a predefined failsafe waypoint in the vicinity of the target 640. Thus, the determination at step s735 can be performed while the UAV (610) is still attached at the just completed target 640 or while it is at the failsafe waypoint. Again, at step s735, a controller of the UAV (610)(onboard or remote) decides whether to safely return the UAV (610) back to the takeoff and landing position ("Yes"), or to command the UAV (610) to go to another inspection job target ("No").

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all implementations or arrangements.

The headings used herein are for organizational purposes only and are not meant to be used to limit the scope of the description or the claims. As used throughout this application, the words "may" and "can" are used in a permissive sense (i.e., meaning having the potential to), rather than the mandatory sense (i.e., meaning must). To facilitate understanding, like reference numerals have been used, where possible, to designate like elements common to the figures. In certain instances, a letter suffix following a dash ( . . . -b) denotes a specific example of an element marked by a particular reference numeral (e.g., 210-*b*). Description of elements with references to the base reference numerals (e.g., 210) also refer to all specific examples with such letter suffixes (e.g., 210-*b*), and vice versa.

The terminology used herein is for the purpose of describing particular implementations only and is not intended to be limiting of the disclosure. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof and meant to encompass the items listed thereafter and equivalents thereof as well as additional items.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting.

While the disclosure has described several example implementations, it will be understood by those skilled in the art that various changes can be made, and equivalents can be substituted for elements thereof, without departing from the spirit and scope of the disclosure. In addition, many modifications will be appreciated by those skilled in the art to adapt a particular instrument, situation, or material to implementations of the disclosure without departing from the essential scope thereof. Therefore, it is intended that the disclosure not be limited to the particular implementations disclosed, or to the best mode contemplated for carrying out this disclosure, but that the disclosure will include all implementations falling within the scope of the appended claims.

The subject matter described above is provided by way of illustration only and should not be construed as limiting. Various modifications and changes can be made to the subject matter described herein without following the example implementations and applications illustrated and described, and without departing from the true spirit and scope encompassed by the present disclosure, which is defined by the set of recitations in the following claims and by structures and functions or steps which are equivalent to these recitations.

What is claimed is:

1. An unmanned aerial vehicle (UAV) comprising:
a body constructed to enable the UAV to fly;
a first leg connected to the body and configured to releasably attach the flying UAV to a ferromagnetic surface, the first leg comprising a magnet adapted to magnetically attach the first leg to the ferromagnetic surface; and
a second leg connected to the body and configured to place an activation device proximate a sensor disposed at least partially on a curved surface in a vicinity of the ferromagnetic surface, the second leg being connected to the body at one end and comprising the activation device disposed at another end opposite the one end,
wherein the second leg is movable in relation to the body to position the activation device towards the sensor while the first leg is magnetically attached to the ferromagnetic surface.

2. The UAV of claim 1, wherein one or more of the first leg and the second leg are coupled to respective mounting points on a rotating rail, the respective mounting points being adapted to rotate the one or more of the first leg and the second leg in relation to the body.

3. The UAV of claim 2, wherein the respective mounting points are motorized for rotating the one or more of the first leg and the second leg during flight of the UAV.

4. The UAV of claim 2, wherein the respective mounting points are adapted to rotate the second leg to orient the activation device according to a placement of the sensor on the curved surface.

5. The UAV of claim 4, wherein the activation device is oriented according to the placement of the sensor on a bottom portion of the curved surface.

6. The UAV of claim 4, wherein the activation device is oriented according to the placement of the sensor on a side portion of the curved surface.

7. A method of inspecting a curved surface using an unmanned aerial vehicle (UAV) by activating a plurality of sensors having at least respective portions disposed on the curved surface, the method comprising:
flying the UAV to a proximity of a first of the plurality of sensors;
activating the first sensor by an activation device coupled to the UAV;
attaching at least one magnetic leg of the UAV to a ferromagnetic surface proximate the first sensor, the at least one magnetic leg having a magnet, comprising:
passively articulating the at least one magnetic leg of the UAV toward the ferromagnetic surface;
magnetically attaching the articulated at least one magnetic leg of the UAV to the ferromagnetic surface using the magnet; and
maintaining the magnetic attachment of the at least one magnetic leg to the ferromagnetic surface;
moving the activation device coupled to the UAV towards the first sensor while the at least one magnetic leg is attached to the ferromagnetic surface; and
when the activation device is positioned in proximity of the first sensor, receiving first sensor data from the activated first sensor via the activation device.

8. The method of claim 7, further comprising:
detaching the at least one magnetic leg of the UAV from the ferromagnetic surface;
navigating the UAV to a proximity of a second of the plurality of sensors;
activating the second sensor by the activation device coupled to the UAV;
moving the activation device towards the second sensor; and
when the activation device is positioned in proximity of the second sensor, receiving second sensor data from the activated second sensor via the activation device.

9. The method of claim 8, wherein, when the receiving of the second sensor data is completed, the UAV navigates to a home base or a proximity of a next sensor.

10. The method of claim 7, wherein the proximity of the activation device to the first sensor is determined based at least in part on a signal strength detected by the activation device from the first sensor.

11. The method of claim 7, further comprising, prior to the activating, orienting the at least one magnetic leg and the activation device according to a placement of the first sensor on the curved surface.

12. The method of claim 11, wherein the at least one magnetic leg and the activation device are oriented according to the placement of the first sensor on a bottom portion of the curved surface.

13. The method of claim 11, wherein the at least one magnetic leg and the activation device are oriented according to the placement of the first sensor on a side portion of the curved surface.

14. An unmanned aerial vehicle (UAV) comprising:
a body constructed to enable the UAV to fly;
one or more legs connected to the body and configured to releasably attach the flying UAV to a ferromagnetic surface, each of the one or more legs comprising a magnet adapted to magnetically attach to the ferromagnetic surface; and
an activation device coupled to the body and adapted to be placed proximate a sensor disposed at least partially on a curved surface in a vicinity of the ferromagnetic surface,
wherein the activation device is movable in relation to the body towards the sensor while the one or more legs are magnetically attached to the ferromagnetic surface.

15. The UAV of claim 14, wherein the one or more legs and the activation device are coupled to respective mounting points that are oriented to a side or a top in relation to the body.

16. The UAV of claim 15, wherein the one or more legs and the activation device are oriented according to a placement of the sensor on a bottom portion of the curved surface.

17. The UAV of claim 15, wherein the one or more legs and the activation device are oriented according to a placement of the sensor on a side portion of the curved surface.

* * * * *

UNITED STATES PATENT AND TRADEMARK OFFICE
CERTIFICATE OF CORRECTION

PATENT NO. : 11,807,407 B2
APPLICATION NO. : 17/655128
DATED : November 7, 2023
INVENTOR(S) : Fadhel Asfoor, Aziz Rehman and Fadl Abdellatif It is certified that error appears in the above-identified patent and that said Letters Patent is hereby corrected as shown below:

On the Title Page

Item (72) the third inventor:
"Fadi Abdellatif"

Should read:
Fadl Abdellatif

Signed and Sealed this
Twenty-eighth Day of May, 2024

Katherine Kelly Vidal
*Director of the United States Patent and Trademark Office*